United States Patent
Hillgardner

(10) Patent No.: US 10,407,280 B2
(45) Date of Patent: Sep. 10, 2019

(54) LENGTH ADJUSTABLE WIRE ROPE RIGGING DEVICE AND LIFTING SYSTEM EMPLOYING THE SAME

(71) Applicant: Brad Hillgardner, Edmonton (CA)

(72) Inventor: Brad Hillgardner, Edmonton (CA)

( * ) Notice: Subject to any disclaimer, the term of this patent is extended or adjusted under 35 U.S.C. 154(b) by 0 days.

(21) Appl. No.: 16/069,243

(22) PCT Filed: Jan. 10, 2017

(86) PCT No.: PCT/CA2017/000003
§ 371 (c)(1),
(2) Date: Jul. 11, 2018

(87) PCT Pub. No.: WO2017/120658
PCT Pub. Date: Jul. 20, 2017

(65) Prior Publication Data
US 2019/0016565 A1    Jan. 17, 2019

(30) Foreign Application Priority Data
Jan. 12, 2016 (CA) ........................... 2917368

(51) Int. Cl.
*B66C 1/12* (2006.01)
*B66C 13/06* (2006.01)
(Continued)

(52) U.S. Cl.
CPC .............. *B66C 1/12* (2013.01); *B66C 1/00* (2013.01); *B66C 13/04* (2013.01); *B66C 13/063* (2013.01); *B66C 13/105* (2013.01); *F16G 11/12* (2013.01)

(58) Field of Classification Search
CPC ....... B66C 1/12; B66C 13/105; B66C 13/063; F16G 11/12
(Continued)

(56) References Cited

U.S. PATENT DOCUMENTS

| 1,928,213 A | 9/1933 | Showers, Jr. et al. |
| 2,020,306 A * | 11/1935 | Fitch ............ B66C 1/101 294/81.3 |

(Continued)

FOREIGN PATENT DOCUMENTS

| CA | 2798397 | 3/2014 |
| WO | 87/03571 | 6/1987 |

OTHER PUBLICATIONS

Canadian Intellectual Property Office (ISA/CA), International Search Report, International Application No. PCT/CA2017/000003, 4 pages, dated Apr. 19, 2017.

(Continued)

*Primary Examiner* — Paul T Chin
(74) *Attorney, Agent, or Firm* — Thompson Hine LLP

(57) ABSTRACT

A wire rope device having adjustable length between a first end and a second end thereof. The wire rope device comprises a first wire rope extending from the first end and a second wire rope extending from the second end. A length adjusting structure is disposed between the first end and the second end. The length adjusting structure has the first wire rope and the second wire rope connected thereto. A support structure is disposed between the first end and the second end. The support structure has the length adjusting structure rotatable movable mounted thereto. A first guiding structure and a second guiding structure are disposed in the support structure for guiding the first wire rope and the second wire rope, respectively, such that when in operation a portion of the first wire rope extending from the first guiding element and a portion of the second wire rope extending from the second guiding element are disposed substantially along a same straight line. A drive mechanism is mounted to the support structure and connected to the length adjusting
(Continued)

structure for adjusting the length of the wire rope device by rotatably moving the length adjusting structure.

17 Claims, 28 Drawing Sheets

(51) Int. Cl.
  *B66C 13/10* (2006.01)
  *F16G 11/12* (2006.01)
  *B66C 1/00* (2006.01)
  *B66C 13/04* (2006.01)

(58) Field of Classification Search
  USPC .................................................. 294/81.3, 74
  See application file for complete search history.

(56) References Cited

U.S. PATENT DOCUMENTS

| | | | | |
|---|---|---|---|---|
| 3,671,015 A | * | 6/1972 | Sullivan | B66C 23/205 294/67.22 |
| 4,394,041 A | * | 7/1983 | de Nachtegaal | B66C 1/10 294/81.3 |
| 4,481,695 A | | 11/1984 | Koster et al. | |
| 4,899,945 A | * | 2/1990 | Jones | B65H 49/34 242/420.6 |
| 5,878,896 A | * | 3/1999 | Eudier | B66C 13/063 212/270 |
| 6,213,421 B1 | * | 4/2001 | Franklin | B60C 27/066 242/384.7 |
| 6,601,718 B2 | * | 8/2003 | Sawodny | B66C 13/063 294/81.4 |
| 7,900,670 B2 | | 3/2011 | McCauley et al. | |
| 2016/0016763 A1 | * | 1/2016 | Lee | B66C 13/46 212/275 |

OTHER PUBLICATIONS

Canadian Intellectual Property Office (ISA/CA), Written Opinion of the International Searching Authority, International Application No. PCT/CA2017/000003, 4 pages, dated Apr. 19, 2017.

* cited by examiner

SECTION F-F

SECTION P-P

DETAIL R

DETAIL T

DETAIL N

LENGTH ADJUSTABLE WIRE ROPE RIGGING DEVICE AND LIFTING SYSTEM EMPLOYING THE SAME

CROSS-REFERENCE TO RELATED APPLICATIONS

This application is a national stage filing of International Application No. PCT/CA2017/000003 (Publication No. WO 2017/120658) entitled LENGTH ADJUSTABLE WIRE ROPE RIGGING DEVICE AND LIFTING SYSTEM EMPLOYING THE SAME filed on Jan. 10, 2017, which in turn claims priority to Canadian Patent Application No. 2,917,368 entitled LENGTH ADJUSTABLE WIRE ROPE RIGGING DEVICE AND LIFTING SYSTEM EMPLOYING THE SAME filed on Jan. 12, 2016. The entire contents of both of these applications are hereby incorporated by reference.

FIELD

The present disclosure relates to wire rope rigging devices for lifting a load, and more particularly, to a length adjustable wire rope rigging device and lifting system employing the same.

BACKGROUND

In present-day commercial and residential environments loads, and in particular, heavy large size loads such as, for example, air conditioner units, compressors, or modules of gas/oil plants, are lifted using a plurality of wire rope slings or chains connected to, for example, lifting lugs of the load and the hook of a crane. When lifting such, typically eccentric, loads, it is highly important to balance the same prior lifting. An unbalanced load exposes different wire rope slings or chains holding the same to different stresses which may result in failure of: one or more of the wire rope slings or chains; and/or the lifting lugs of the load having the wire rope slings or chains connected thereto, resulting in a catastrophic drop of the load.

Furthermore, when setting a load onto a foundation, anchor bolts, or other securing devices it is difficult, if not impossible, to properly place the load thereon when the same is unbalanced.

Typically, loads are balanced by adding/removing shackles connected to the wire rope sling or chain, or by replacing the same with a wire rope sling or chain having a different length. This is usually determined in a time consuming trial and error process of slightly lifting the eccentric load and setting the same down again until the load is balanced properly.

It may be desirable to provide a length adjustable wire rope rigging device that enables remotely controlled length adjustment thereof.

It also may be desirable to provide a length adjustable wire rope rigging device that enables a substantial change of length thereof.

It also may be desirable to provide a length adjustable wire rope rigging device that enables measurement of a tension acting thereon.

It also may be desirable to provide a lifting system comprising a plurality of length adjustable wire rope rigging devices that enables remotely controlled balancing of a load.

It also may be desirable to provide an adjustable module lifting device comprising a plurality of length adjustable wire rope rigging devices that enables remotely controlled balancing of the module.

SUMMARY

Accordingly, one object of the present disclosure is to provide a length adjustable wire rope rigging device that enables remotely controlled length adjustment thereof.

Another object of the present disclosure is to provide a length adjustable wire rope rigging device that enables a substantial change of length thereof.

Another object of the present disclosure is to provide a length adjustable wire rope rigging device that enables measurement of a tension acting thereon.

Another object of the present disclosure is to provide a lifting system comprising a plurality of length adjustable wire rope rigging devices that enables remotely controlled balancing of a load.

Another object of the present disclosure is to provide a length adjustable wire rope rigging device that enables measurement of a tension acting thereon.

According to one aspect of the present disclosure, there is provided a wire rope device having adjustable length between a first end and a second end thereof. The wire rope device comprises a first wire rope extending from the first end and a second wire rope extending from the second end. A length adjusting structure is disposed between the first end and the second end. The length adjusting structure has the first wire rope and the second wire rope connected thereto. A support structure is disposed between the first end and the second end. The support structure has the length adjusting structure rotatable movable mounted thereto. A first guiding structure and a second guiding structure are disposed in the support structure for guiding the first wire rope and the second wire rope, respectively, such that when in operation a portion of the first wire rope extending from the first guiding element and a portion of the second wire rope extending from the second guiding element are disposed substantially along a same straight line. A drive mechanism is mounted to the support structure and connected to the length adjusting structure for adjusting the length of the wire rope device by rotatably moving the length adjusting structure.

According to one aspect of the present disclosure, there is provided a wire rope device having adjustable length between a first end and a second end thereof. The wire rope device comprises a first wire rope extending from the first end and a second wire rope extending from the second end. A length adjusting structure is disposed between the first end and the second end. The length adjusting structure has the first wire rope and the second wire rope connected thereto. A support structure is disposed between the first end and the second end. The support structure has the length adjusting structure rotatable movable mounted thereto. A first guiding structure and a second guiding structure are disposed in the support structure for guiding the first wire rope and the second wire rope, respectively, such that when in operation a portion of the first wire rope extending from the first guiding element and a portion of the second wire rope extending from the second guiding element are disposed substantially along a same straight line. A drive mechanism is mounted to the support structure and connected to the length adjusting structure for adjusting the length of the wire rope device by rotatably moving the length adjusting structure. The length adjusting structure comprises a plurality of clamping devices connecting the length adjusting structure to the first and the second wire rope. The clamping devices are operable in an open mode for receiving/releasing the respective wire rope and in a closed mode for clamping the respective wire rope. The support structure comprises a third guiding structure and a fourth guiding structure disposed in proximity to the second guiding structure and the first guiding structure, respectively, the third guiding structure and the fourth guiding structure for guiding the first wire rope and the second wire rope, respectively, such that when in operation a portion of the first wire rope and a portion of the second wire rope exit/enter the support structure substantially parallel to the straight line.

According to another aspect of the present disclosure, there is provided a system for lifting a load. The system comprises a plurality of wire rope devices. Each wire rope device has a controllable drive mechanism for adjusting a length between a first eye and a second eye thereof. A controller is in communication with the controllable drive mechanism of each of the wire rope devices for controllably adjusting the length of each of the wire rope devices.

According to another aspect of the present disclosure, there is provided a module lifting device. The module lifting device comprises a spreader bar having a rail system disposed thereon along a longitudinal axis thereof. A plurality of load holding bars is disposed along the spreader bar. Each load holding bar is movable mounted to the rail system and oriented substantially perpendicular to spreader bar. A controllable load holding bar drive mechanism is mounted to each load holding bar for controllably moving the load holding bar along the spreader bar. A wire rope device having a controllable drive mechanism for adjusting a length thereof is connected to each end of each load holding bar.

An advantage of the present disclosure is that it provides a length adjustable wire rope rigging device that enables remotely controlled length adjustment thereof.

A further advantage of the present disclosure is that it provides a length adjustable wire rope rigging device that enables a substantial change of length thereof.

A further advantage of the present disclosure is that it provides a length adjustable wire rope rigging device that enables measurement of a tension acting thereon.

A further advantage of the present disclosure is that it provides a lifting system comprising a plurality of length adjustable wire rope rigging devices that enables remotely controlled balancing of a load.

A further advantage of the present disclosure is that it provides an adjustable module lifting device comprising a plurality of length adjustable wire rope rigging devices that enables remotely controlled balancing of the module.

BRIEF DESCRIPTION OF THE DRAWINGS

An embodiment of the present disclosure is described below with reference to the accompanying drawings, in which:

FIG. 1l is a simplified block diagram illustrating in a perspective view the length adjusting structure of the length adjustable wire rope device according to an embodiment of the invention;

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

While the description of certain embodiments hereinbelow is with reference to a length adjustable wire rope device used for rigging a load to a lifting device such as, for example, the hook of a crane, it will become evident to those skilled in the art that the embodiments of the invention are not limited thereto, but that the length adjustable wire rope device is also implementable as adjustable cable tensioners of, for example, guy-wires of masts or suspension cables of suspended roof structures.

Figure 1A:
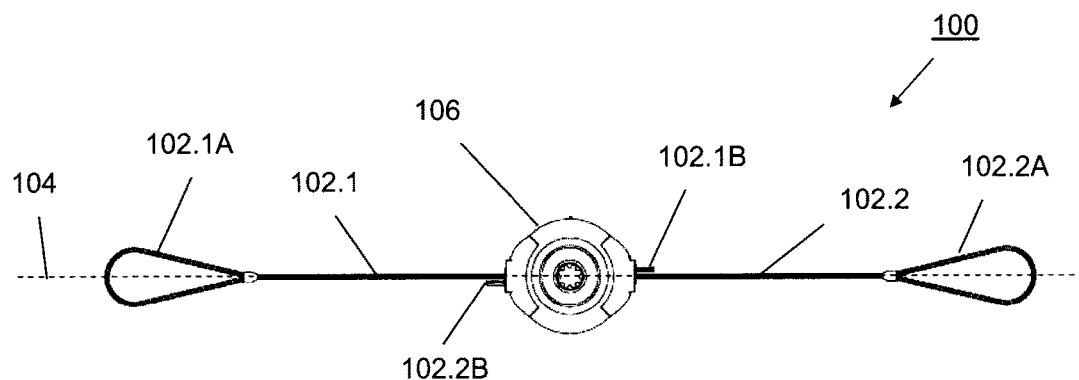
FIGS. 1a and 1b are simplified block diagrams illustrating in a top view and a side view, respectively, a length adjustable wire rope device according to an embodiment of the invention.
Figure 1B:
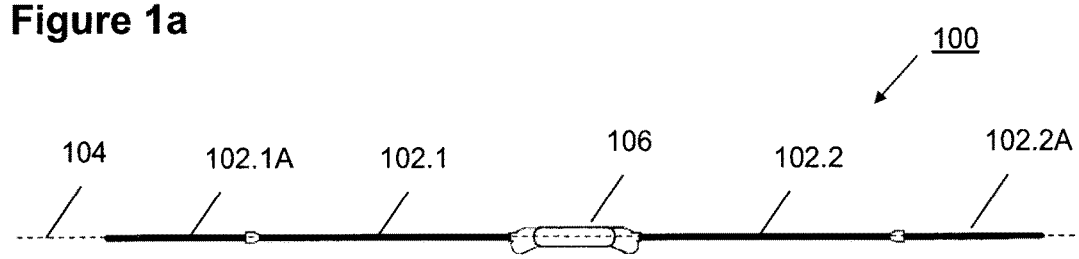
Figure 1C:
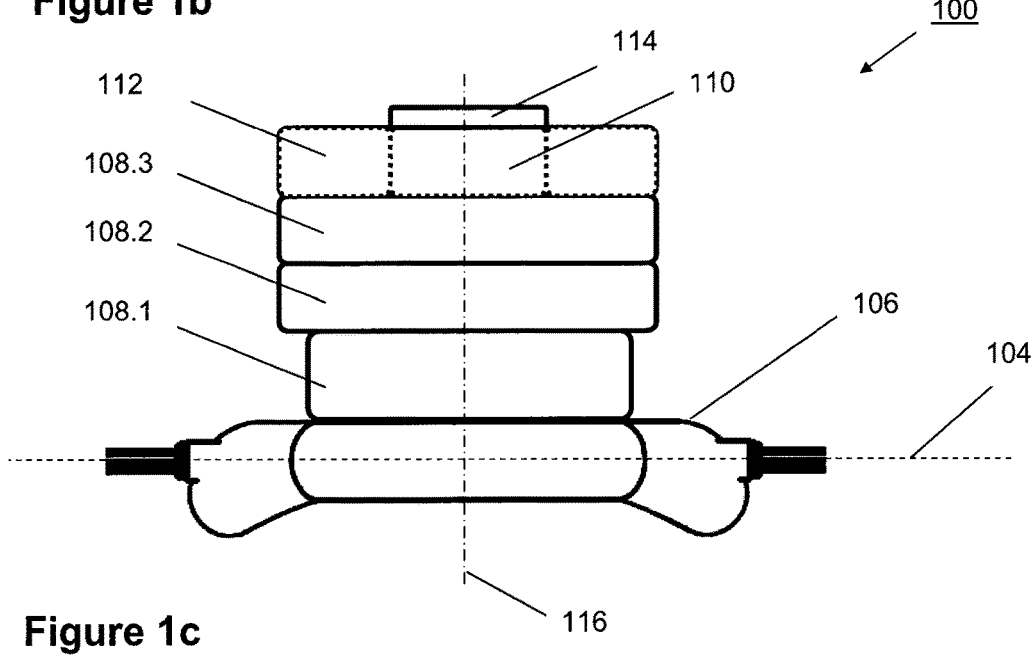
FIGS. 1c to 1e are simplified block diagrams illustrating in two side views and a perspective view, respectively, a central portion of the length adjustable wire rope device according to an embodiment of the invention.
Figure 1D:
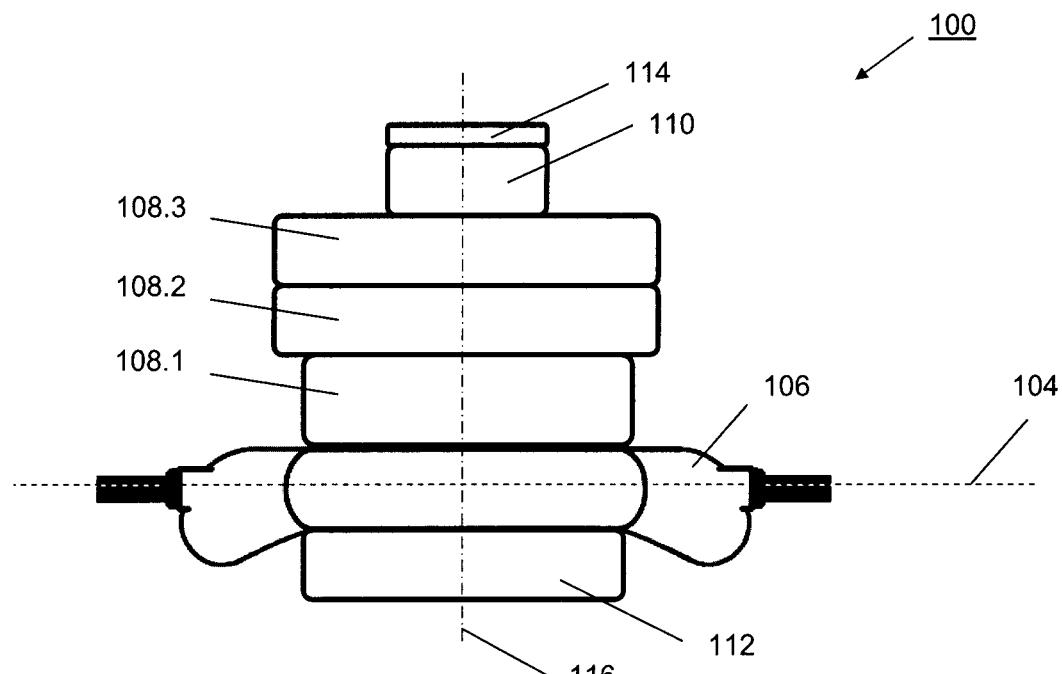
Figure 1E:
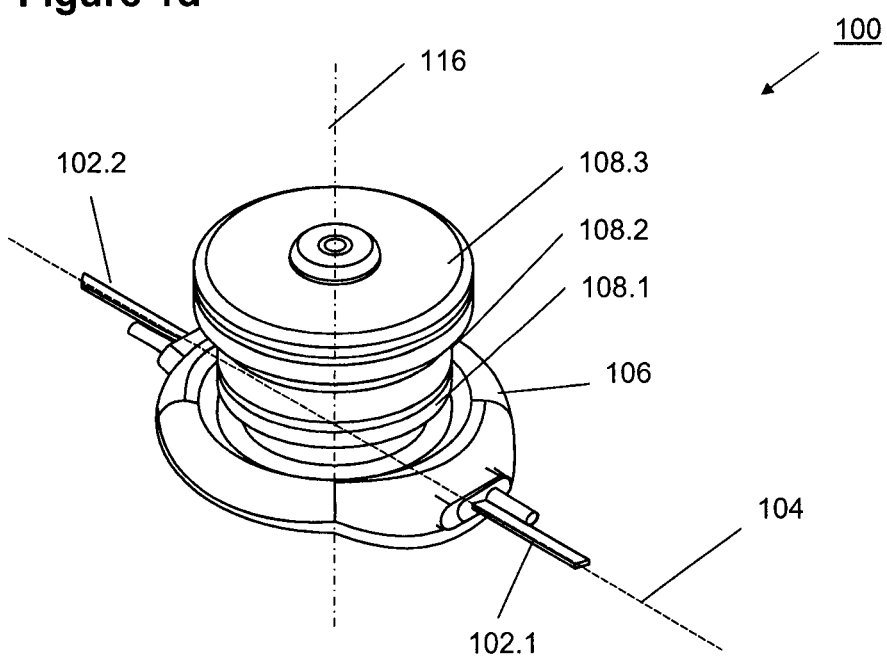
Figure 1F:
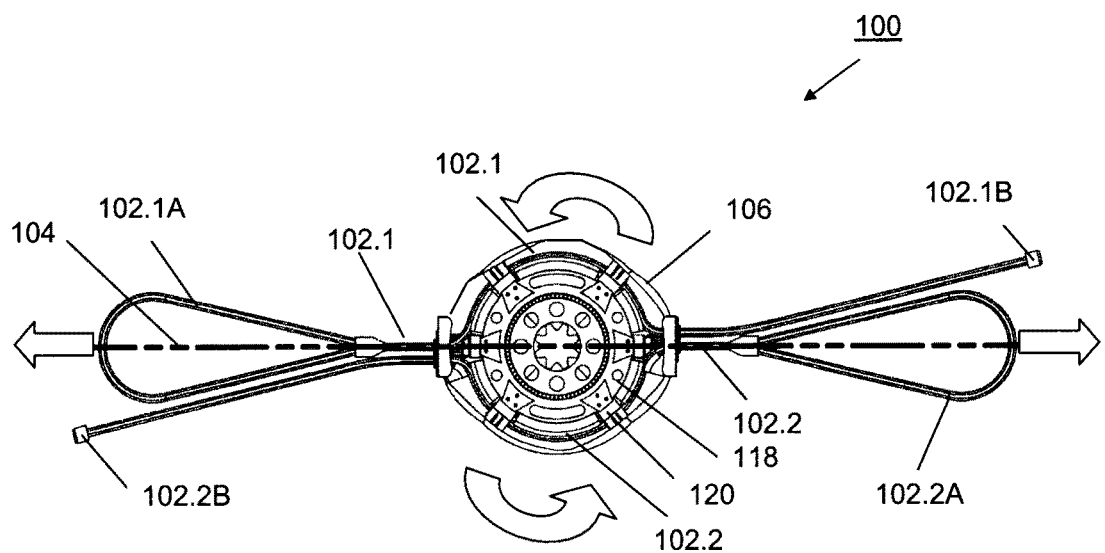
FIGS. 1f and 1g are simplified block diagrams illustrating in top views the length adjustable wire rope device according to an embodiment of the invention with the device being in the retracted position and the extended position, respectively.
Figure 1G:
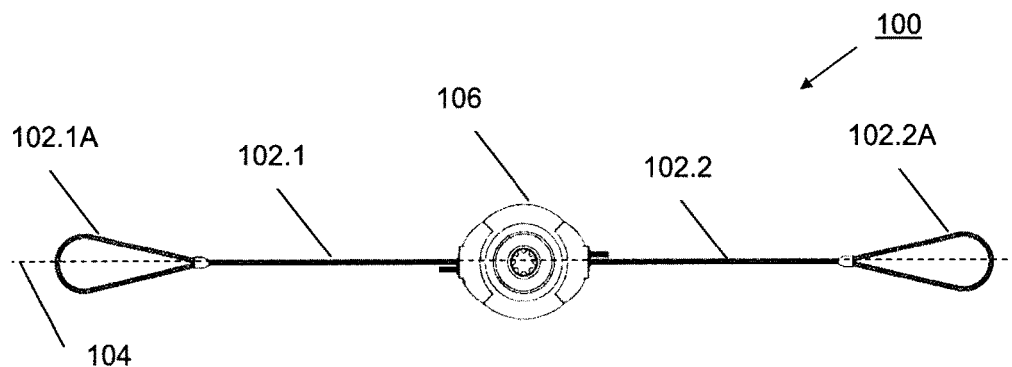
Figure 1H:
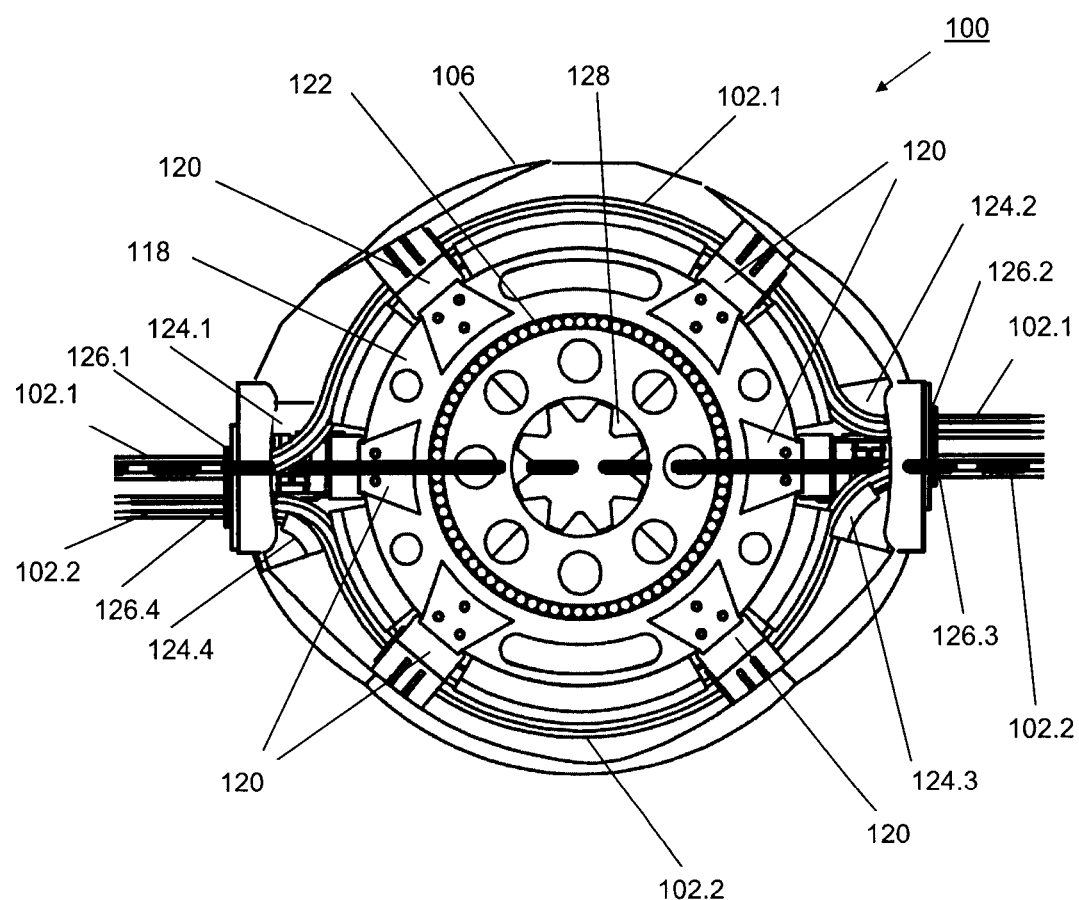
FIGS. 1h and 1i are simplified block diagrams illustrating in a top view and a side view, respectively, a length adjusting structure of the length adjustable wire rope device according to an embodiment of the invention.
Figure 1I:
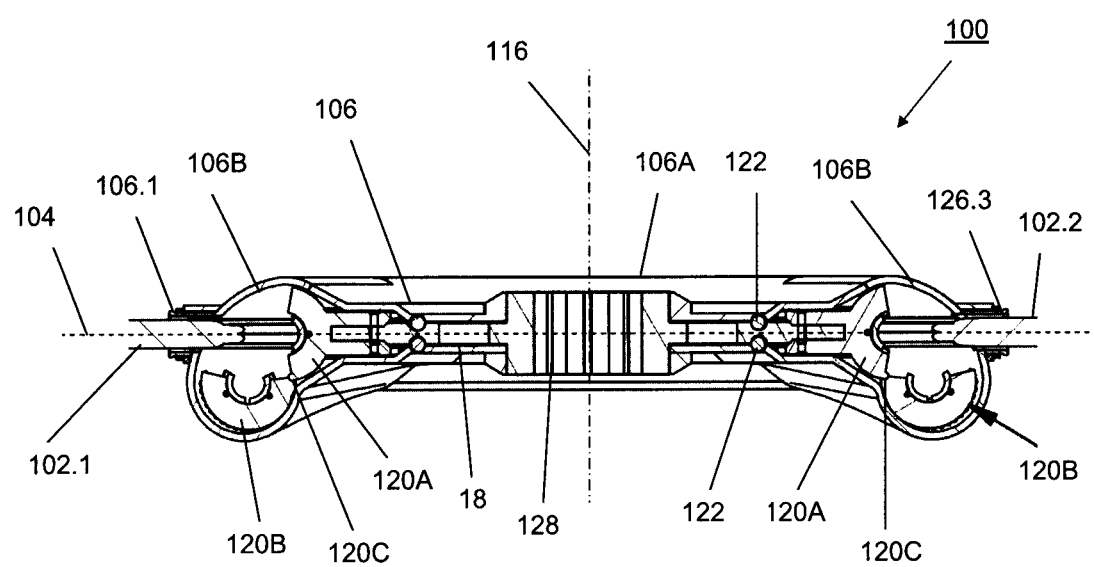
Figure 1J:
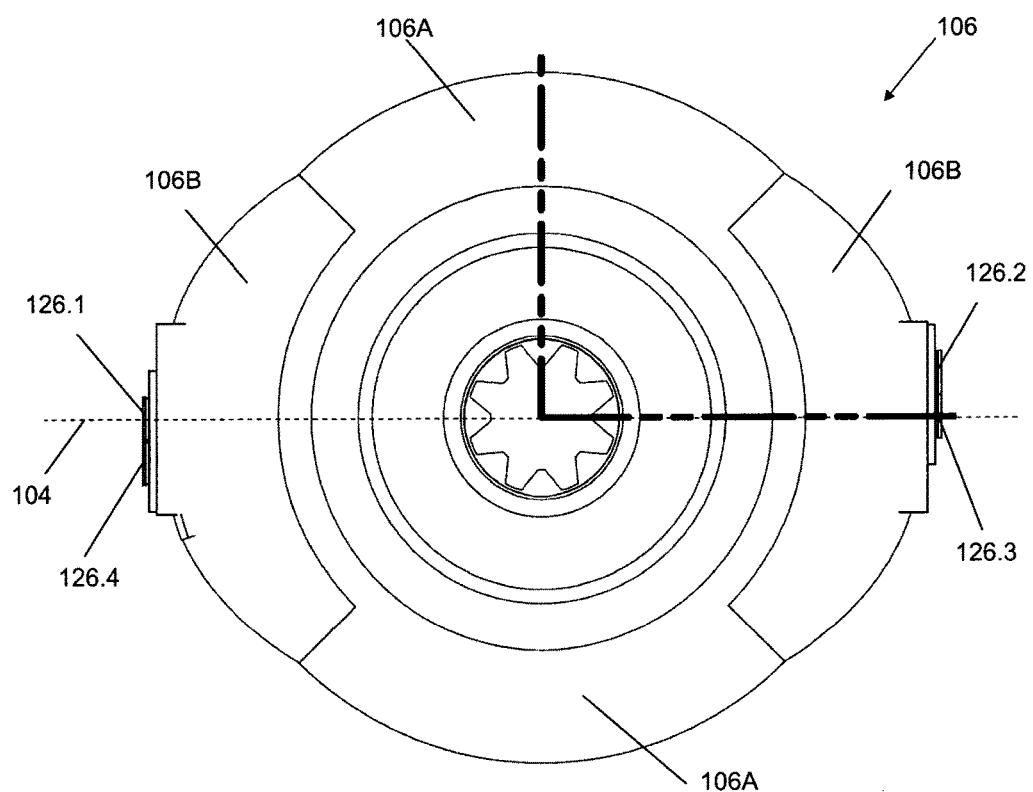
FIGS. 1j and 1k are simplified block diagrams illustrating in a top view and a side view, respectively, a housing enclosing the length adjusting structure of the length adjustable wire rope device according to an embodiment of the invention.
Figure 1K:
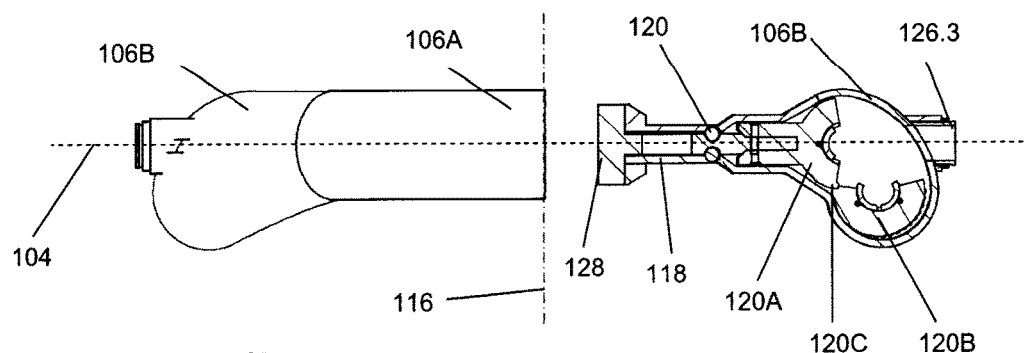
Figure 1I:
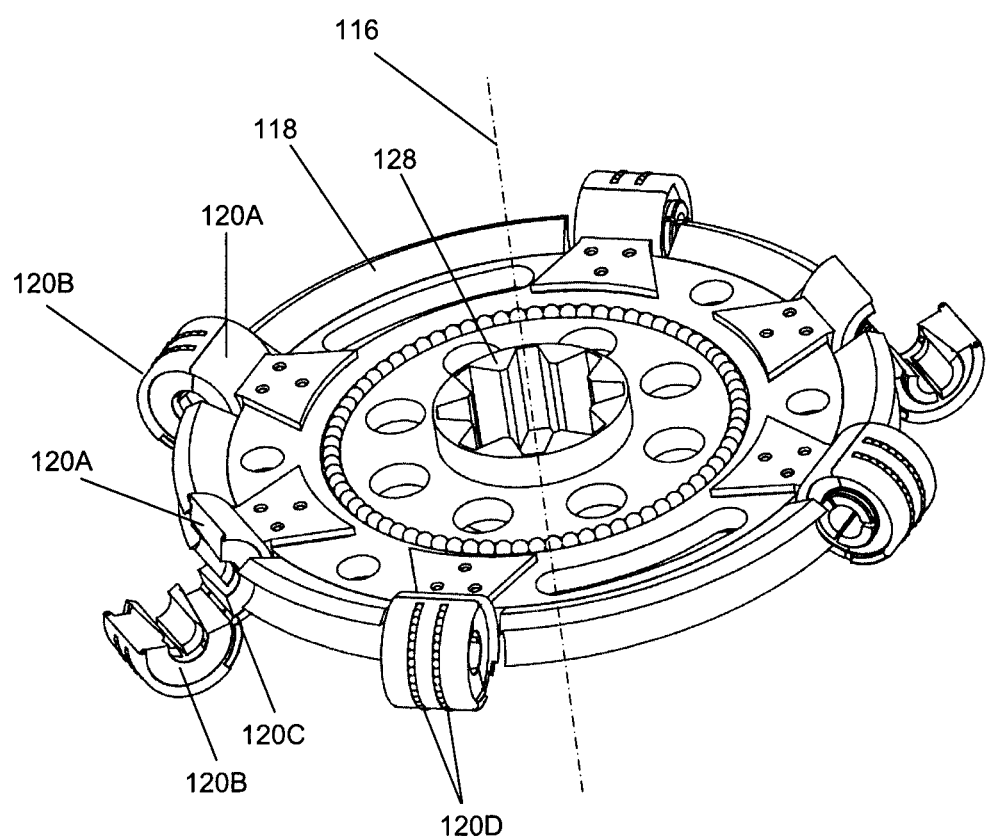
Figure 1M:
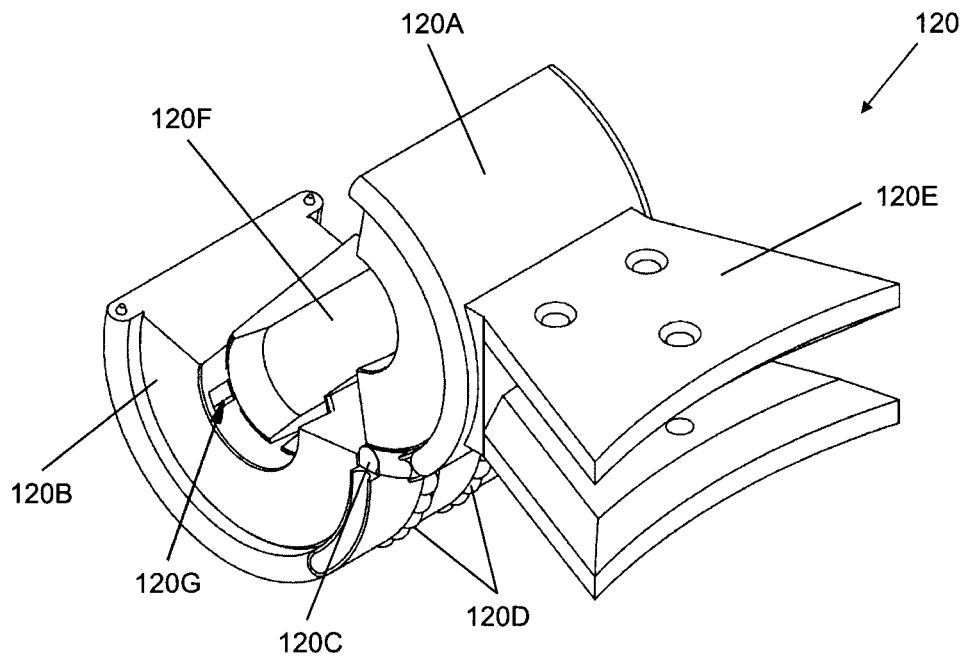
FIGS. 1m to 1p are simplified block diagrams illustrating in a perspective view, a top view, a side view, and a cross sectional view, respectively, a clamping device of the length adjustable wire rope device according to an embodiment of the invention.
Figure 1N:
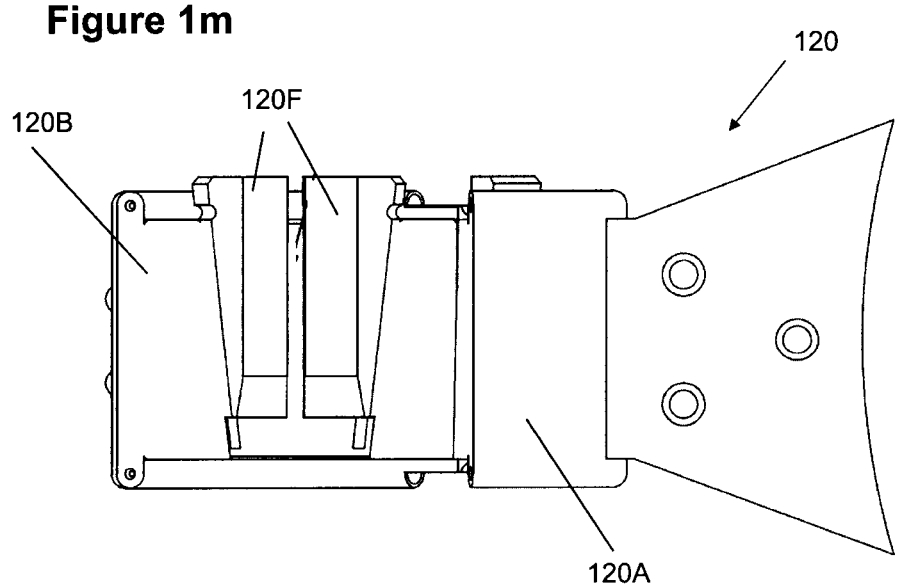
Figure 1O:
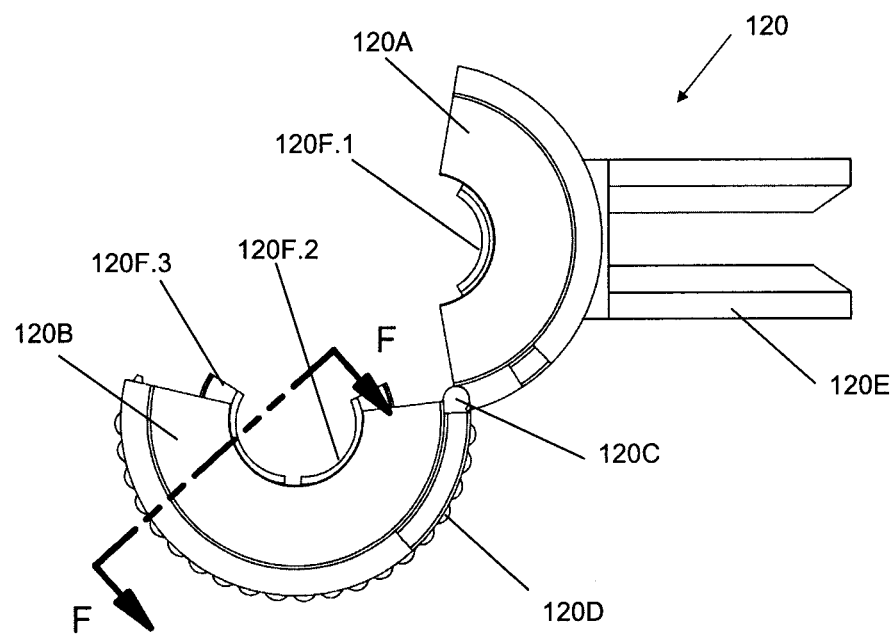
Figure 1P:
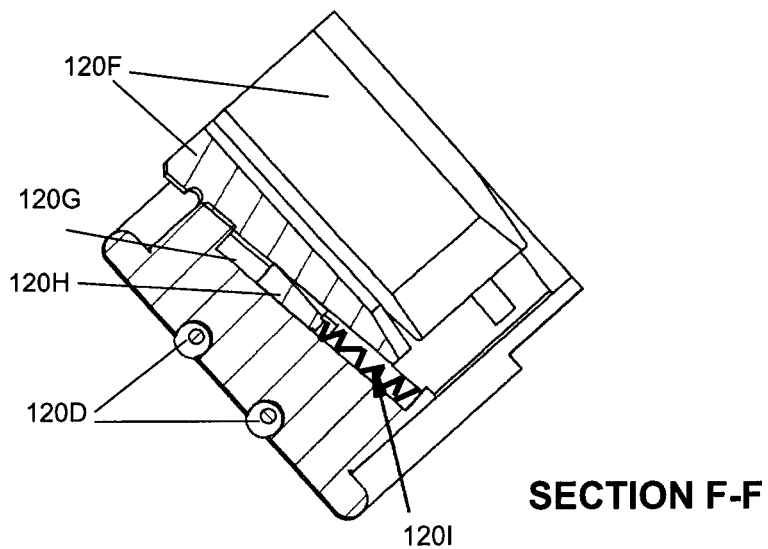
Figure 1Q:
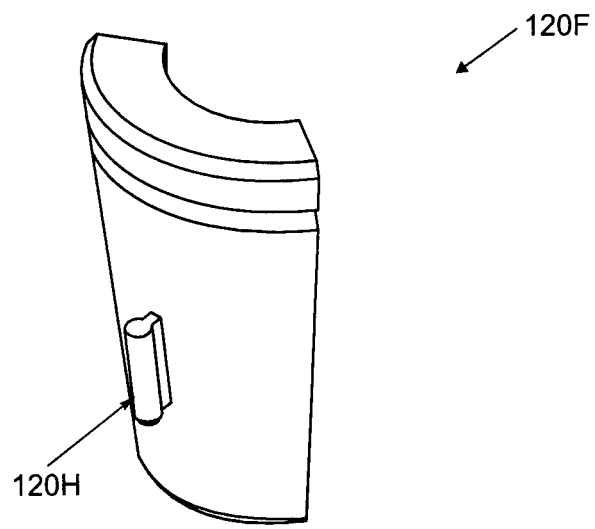
FIGS. 1q and 1r are simplified block diagrams illustrating in a perspective view and a side view, respectively, a collect of the clamping device of the length adjustable wire rope device according to an embodiment of the invention.
Figure 1R:
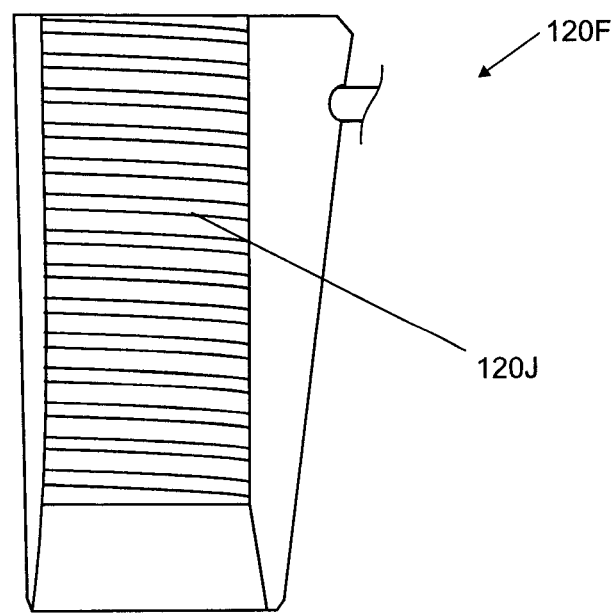

Referring to FIGS. 1a to 1r, a length adjustable wire rope device 100 according to an embodiment of the invention is provided. The length adjustable wire rope device 100 comprises a first wire rope 102.1 extending from a first end 102.1A and a second wire rope 102.2 extending from a second end 102.2A. The wire rope ends 102.1A, 102.2A forming, for example, eyes of a wire rope sling—as illustrated in FIG. 1a—for use in crane rigging. A length adjusting structure 118 is disposed between the first end 102.1A and the second end 102.2A. The length adjusting structure 118, 120 has the first wire rope 102.1 and the second wire rope 102.2 connected thereto. The length adjusting structure 118 is rotatable movable mounted to a support structure which is, in one case, provided as an enclosing housing 106. Guiding structures 124.1 and 124.3 are disposed in the housing 106 in proximity to wire rope openings 126.1 and 126.3, respectively, for guiding the first wire rope 102.1 and the second wire rope 102.2, respectively, such that when in operation a portion of the first wire rope 102.1 extending from the guiding element 124.1 and a portion of the second wire rope 102.2 extending from the guiding element 124.3 are disposed substantially along a same straight line 104. A drive mechanism is mounted to the housing 106 and connected to the length adjusting structure 118 for adjusting the length of the wire rope device 100 by rotatably moving the length adjusting structure 118 about axis 116 which is oriented substantially perpendicular to the line 104.

The drive mechanism can comprise a planetary gear 108.1, 108.2, 108.3, as will be described hereinbelow with reference to FIGS. 2a to 2d, and electric motor 110. The electric motor 110 can be powered using rechargeable battery 112 mounted to the electric motor 110, as illustrated in FIG. 1c or, alternatively, to the housing 106 opposite to the drive mechanism for balancing the weight. Operation of the electric motor 110 is controlled via controller 114, in one case, mounted thereto. The drive mechanism is removable mounted to the housing 106 in a conventional manner using, for example, screw bolts, and is connected to the length adjusting structure 118 also in a conventional manner using for example, mating coupler elements 128 and 130. Alternatively, a hydraulic or pneumatic drive may be employed.

The length adjusting structure 118 can be provided as a wheel 118 having a wire rope interacting structure disposed on its circumference—for example, in the form of a channel having a substantially semi-circular cross section—for accommodating a portion of the first wire rope 102.1 and the second wire rope 102.2 therein. The hub of the wheel 118 is shaped to form the coupler element 128 for being mated with the respective coupler element 130 of the planetary gear 108.1, 108.2, 108.3. For example, the wheel 118 is made of steel using a conventional forging or molding process and is rotatable movable mounted to the housing 106 in a conventional manner using, for example, ball bearings 122.

The housing 106 further comprises guiding structures 124.2 and 124.4 disposed in proximity to wire rope openings 126.2 and 126.4, respectively, which are placed adjacent the wire rope openings 126.3 and 126.1, respectively, as illustrated in FIGS. 1h and 1j. The guiding structures 124.2 and 124.4 guide the first wire rope 102.1 and the second wire rope 102.2, respectively, such that when in operation a portion of the first wire rope 102.1 and a portion of the second wire rope 102.1 exit/enter the housing 106 substantially parallel to the straight line. The guiding structures 124.1 to 124.4 are, for example, provided as channels disposed in the housing 106 having a substantially semi-circular cross section for accommodating a portion of the respective wire rope therein.

Clamping devices 120 are mounted to the wheel 118 in a conventional manner using, for example, screw fasteners. The clamping devices 120 are operable in an open mode for receiving/releasing the respective wire rope 102.1, 102.2 and in a closed mode for clamping the respective wire rope 102.1, 102.2, as illustrated in FIG. 1l. Six clamping devices 120 can be provided for safety reasons such that each wire rope 102.1, 102.2 is always clamped by two clamping devices 120 in the closed mode while a third clamping device 120 is in the open mode for receiving/releasing the respective wire rope 102.1, 102.2.

The inside of the housing 106 is shaped such that it comprises: sections 106A forming a channel having a circular cross section for accommodating the clamping devices 120 in the closed mode therein when rotated about the axis 116; enlarged sections 106B disposed in proximity to the openings 126.1 to 126.4 for enabling movement of the clamping devices 120 in the open mode therethrough with the cross section of the enlarged sections 106B gradually changing to the circular cross section of the sections 106A for enabling gradual opening/closing of the clamping devices 120, as illustrated in FIGS. 1h to 1l. For example, the housing 106 is made of steel using a conventional forging or molding process for forming two portions of the housing 106 by splitting the same in a plane through line 104 and oriented perpendicular to the axis 116, which are mounted together in a conventional manner using screw fasteners.

In operation, the length of the wire rope device 100 is extended by rotating the wheel 118 with the clamping devices 120 in counter clockwise direction, as illustrated by the block arrows in FIG. 1*f*. During the rotation of the wheel two clamping devices 120 in the closed position move the respective wire rope while the third clamping device 120—in proximity to the openings 126.1 to 126.4—first releases one of the wire ropes and then receives the other of the wire ropes, as illustrated in FIGS. 1*h* and 1*i*. This process may be continued—with the wheel 118 being rotated 360° several times—until the length of the wire rope device 100 is properly adjusted or fully extended, as illustrated in FIG. 1*g*, thus enabling a substantial change of length of the wire rope device 100. The wire ropes 102.1, 102.2 can be provided with stopping elements 102.1B, 102.2B, respectively, which are abutted at the respective openings 126.2, 126.4 when the wire rope device 100 is fully extended to prevent accidental release of the wire ropes 102.1, 102.2 from the wheel 118. The wire rope device 100 is shortened by performing the same process with the wheel 118 being rotated in clockwise direction.

Referring to FIGS. 1*m* to 1*r*, each clamping device 120 comprises a cup structure having a fixed cup portion 120A and a movable cup portion 120B. The fixed cup portion 120A is connected to mounting plates 120E. The movable cup portion 120B is pivotally movable mounted to the fixed cup portion 120A at hinge 120C. The fixed cup portion 120A and the movable cup portion 120B form in the closed position a tapered bore for accommodating collets 120F therein—for example, three collets 120F.1, 120F.2, and 120F.3. Each of the collets 120F is movable along a direction parallel to the wall of the tapered bore guided by guiding element 120H which is accommodated in a respective channel 120G disposed in the cup structure. Each of the collets 120F is spring loaded via compression spring 120I disposed between the cup structure and the guiding element 120H. The outside of the movable cup portion 120B can comprise ball bearings 120D for interacting with the inside wall of the housing 106, thus facilitating movement of the movable cup portion 120B therealong.

The cup structure is made, for example, in two pieces—cup portion 120A with mounting plates 120E and movable cup portions 120B—of steel using a conventional forging or molding process. The two pieces are then pivotally movable connected using, for example, a barrel hinge mechanism.

As the cup is closed after receiving the wire rope 102.1, 102.2, gripping surfaces 120J, for example, as illustrated in FIG. 1*r*, of the collets 120F grip the wire rope, and as the cup structure is moved, the collets 120F are moved towards the tapered end of the bore and pressed between the wall of the bore and the wire rope resulting in a non-fail slip connection. For releasing the wire rope 102.1, 102.2 the compression springs 120I—which have been compressed during the previous gripping process of the wire rope 102.1, 102.2—push the collets 120F away from the tapered end resulting in the opening of the cup structure.

It is noted that wire rope device 100 employing the cup structure described hereinabove is adaptable for various sizes of wire ropes having, for example, a diameter ranging between 2 cm and 15 cm.

Alternatively, the wire ropes may be fixedly mounted to the length adjusting structure comprising a wheel or winch drum, for example, in situations where only wire ropes of small cross sections—for example, wire ropes having less than 2 cm diameter—are employed or where only small length adjustments—requiring less than 180° degree rotation—are needed.

Figure 2A:
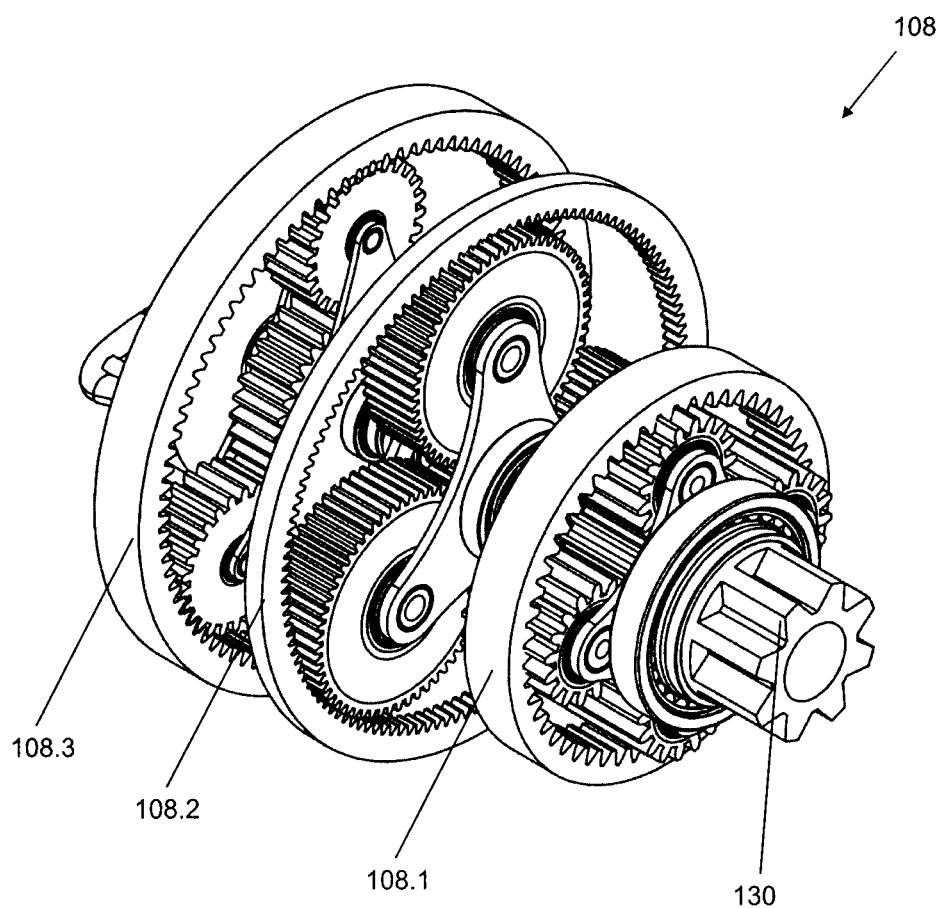
FIGS. 2a to 2d are simplified block diagrams illustrating in an exploded perspective view, a side view, and the cross sectional views, respectively, a planetary gear of the length adjustable wire rope device according to an embodiment of the invention.
Figure 2B:
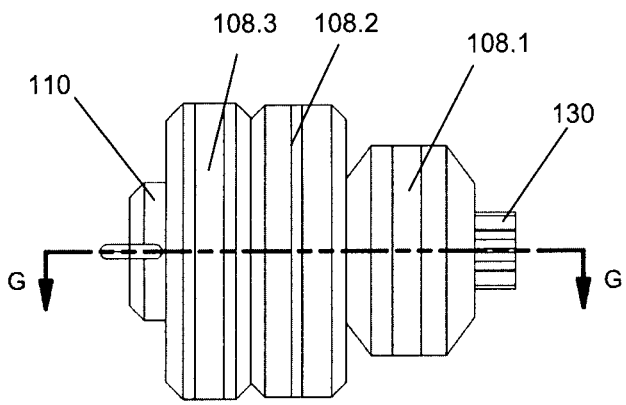
Figure 2C:
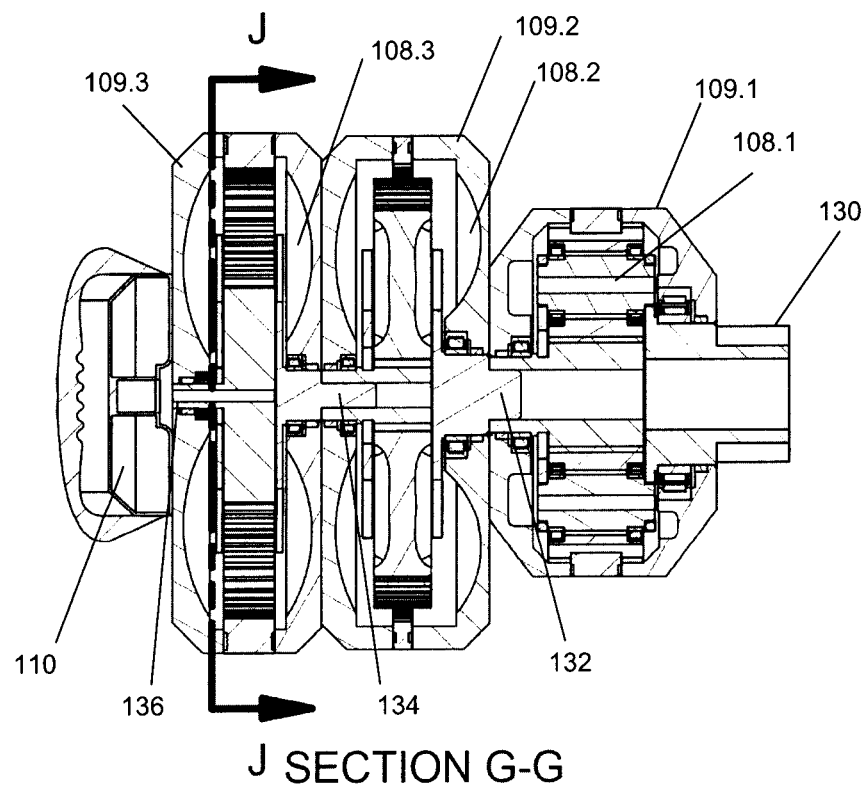
Figure 2D:
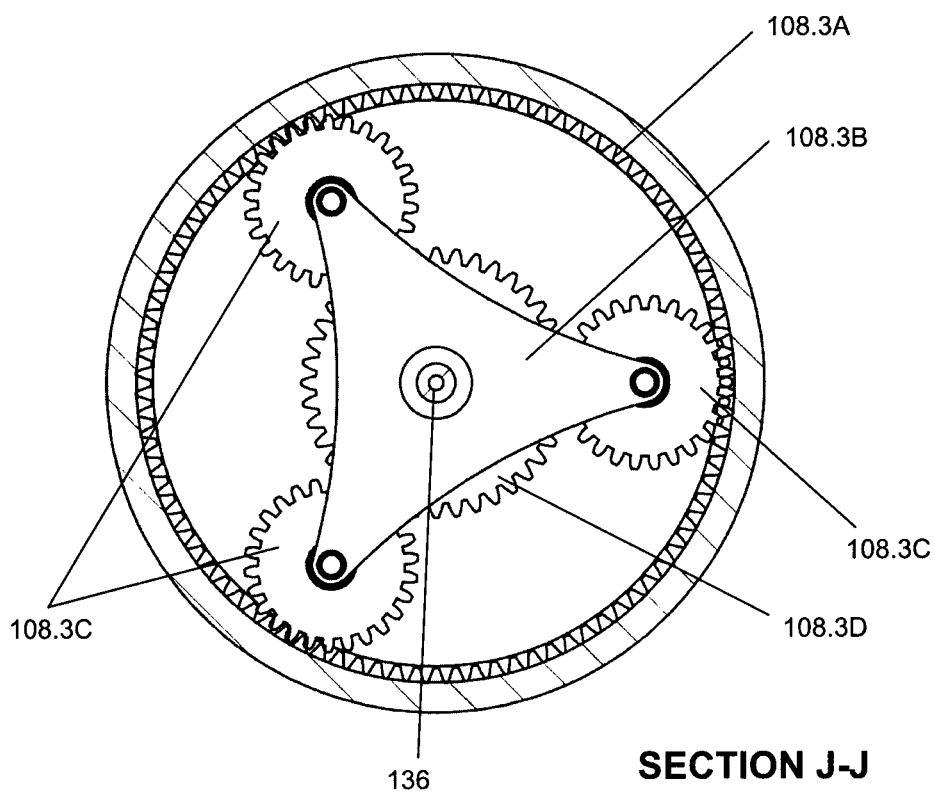

Referring to FIGS. 2*a* to 2*d*, the drive mechanism can comprise a triple compound planetary gear 108.1, 108.2, 108.3 having a gear ratio of, for example, 1800:1, enabling use of a 5 hp motor to achieve 43000 Nm torque for rotating the wheel 118. The three gear sections 108.1, 108.2, 108.3 are of similar conventional planetary gear design and comprise the same components as illustrated in FIG. 2*d* for gear section 108.3, which comprises annular gear 108.3A (fixedly mounted to the gear housing), planet gears 108.3C rotatable movable mounted to carrier 108.3B, and sun gear 108.3D. The carrier 108.3B is driven by the motor 110 via coupler 136, thus rotating the carrier 108.3B with the planetary gears 108.3C which in concert with the annular gear 108.4 drive the sun gear 108.3D. The sun gear 108.3 is connected to the carrier gear of gear section 108.2 via coupler 134 while the sun gear of gear section 108.2 is connected to the carrier gear of gear section 108.1 via coupler 132. Finally the sun gear of gear section 108.1 is connected to coupler element 130 for being mated with coupler element 128 of the wheel 118. Each gear section reduces the rotational speed provided by the motor 110, thus increasing the torque.

Each gear section 108.1, 108.2, 108.3 can be provided as a separate unit disposed in a respective gear housing 109.1, 109.2, 109.3, as illustrated in FIG. 2*c*, for facilitating assembly/disassembly of the wire rope device 100. The gear housings 109.1, 109.2, 109.3 are then connected in a conventional manner using, for example, screw bolts, while the couplers 136, 134, and 132 comprise mating coupler elements, for example, similar to the mating coupler elements 128 and 130.

The gear components are made of, for example, steel using a conventional forging or molding process, while the gear housings are made of, for example, a light weight material such as aluminum using a conventional forging or molding process, for facilitating handling of the gear sections. Alternatively, some gear components, for example, of gear section 108.3 may also be made of a light weight material.

The drive mechanism can comprise a conventional hoist load brake mechanism such as, for example, a sprag clutch, to prevent the wire rope device 100 from dropping the load in the event of a mechanical/electrical failure of thereof.

Alternatively, the drive mechanism may comprise different types of gear such as, for example, a double compound planetary gear, a single planetary gear, or a worm drive. It is noted that it has been found that the triple compound planetary gear with each gear section in a separate gear housing, as described hereinabove, substantially facilitates handling during assembly/disassembly of the device.

Figure 3A:
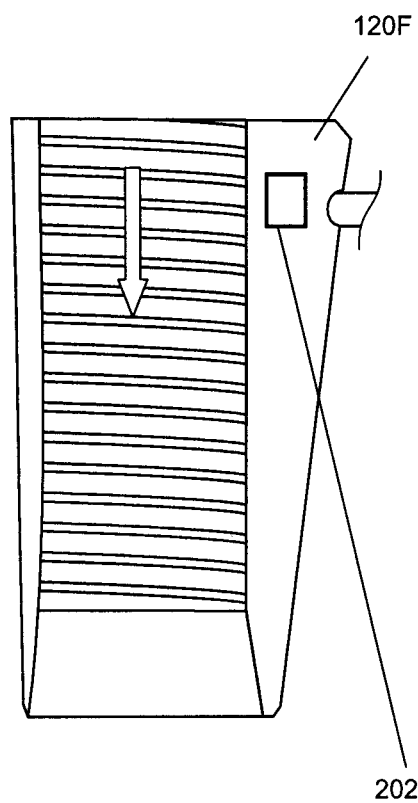
FIG. 3a is a simplified block diagram illustrating in a side view a collect having a strain gauge of the clamping device of the length adjustable wire rope device according to an embodiment of the invention.
Figure 3B:
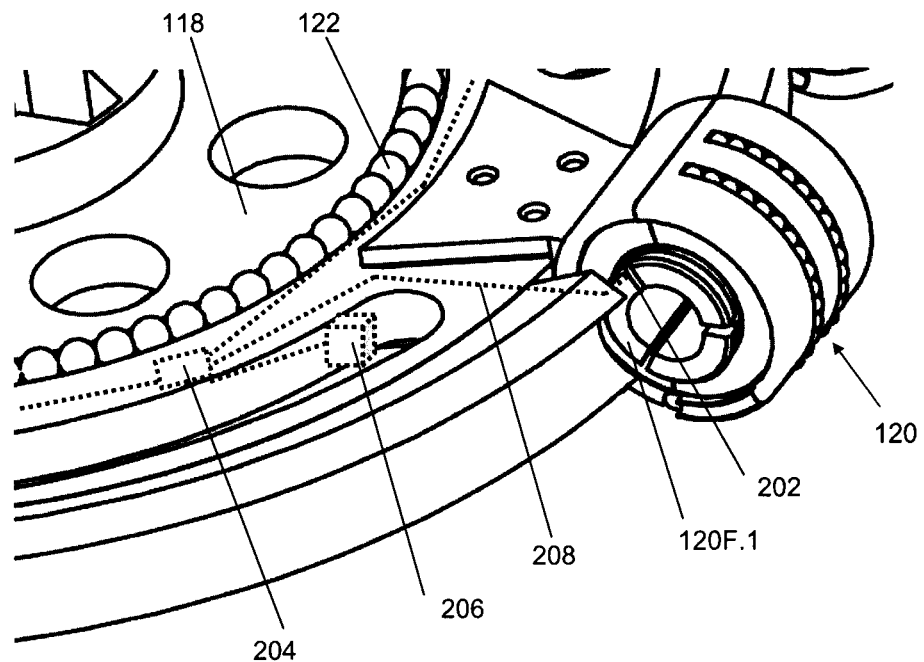
FIG. 3b is a simplified block diagram illustrating in a perspective view a load measuring control circuit of the length adjustable wire rope device according to an embodiment of the invention.
Figure 3C:
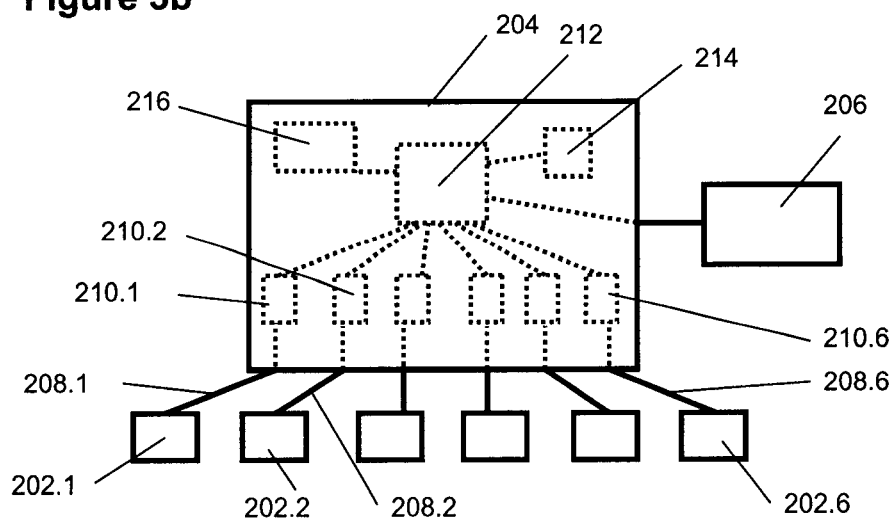
FIGS. 3c to 3e are simplified block diagrams illustrating a control system of the length adjustable wire rope device according to an embodiment of the invention.
Figure 3D:
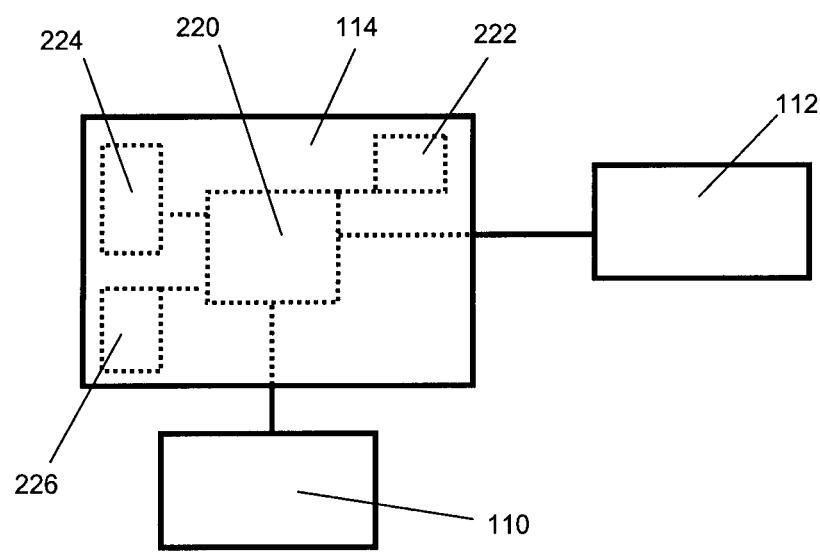

Referring to FIGS. 3*a* to 3*e*, a load lifting system 200 according to an embodiment of the invention is provided. Each clamping device 120 of the wire rope device 100 can be provided with a conventional strain gauge 202 disposed on at least one of its collets 120F for measuring the strain acting thereon induced by the load acting on the wire rope device 100, as indicated by the block arrow in FIG. 3*a*. For example, each clamping device 120 disposed on the wheel 118 is provided with one strain gauge 202.1, . . . 202.6 with each being connected to a respective conventional Wheatstone bridge 210.1, . . . 210.6—for example, a full Wheatstone bridge for measuring the change of resistance of the strain gauge caused by the strain acting on the collet 120F—of control circuit 204 disposed on the wheel 118, as illustrated in FIGS. 3*b* and 3*c*. The control circuit 204 further comprises a processor 212 such as, for example, an off-the-shelf Programmable Logic Controller (PLC) for executing executable commands stored in non-volatile memory 214 such as, for example, flash-memory, with the processor 212 being connected to each of the Wheatstone bridges 210.1 to 210.6. The processor 212 determines the load based on the measurements received from each of the Wheatstone bridges 210.1 to 210.6 and provides load data indicative of the load acting on the wire rope device 100 to antenna 216 connected thereto for wireless transmission. The controller 204 and the strain gauges 202 are powered, for example, using a rechargeable battery disposed in the wheel 118. The load data can be transmitted to the control circuit 114 disposed on the motor 110 where they are received by antenna 226, illustrated in FIG. 3d. The control circuit 114 comprises a processor 220 such as, for example, an off-the-shelf Programmable Logic Controller (PLC) for executing executable commands stored in non-volatile memory 222 such as, for example, flash-memory, with the processor 220 being connected to the antenna 226, antenna 224, the memory 222, the electric motor 110 and the battery 112. Preferably, the control circuit 114 communicates remotely with computer 230 via the antenna 224, using state of the art wireless telecommunication technologies such as, for example, cell phone network technologies or Wi-Fi local network technologies.

Figure 3E:
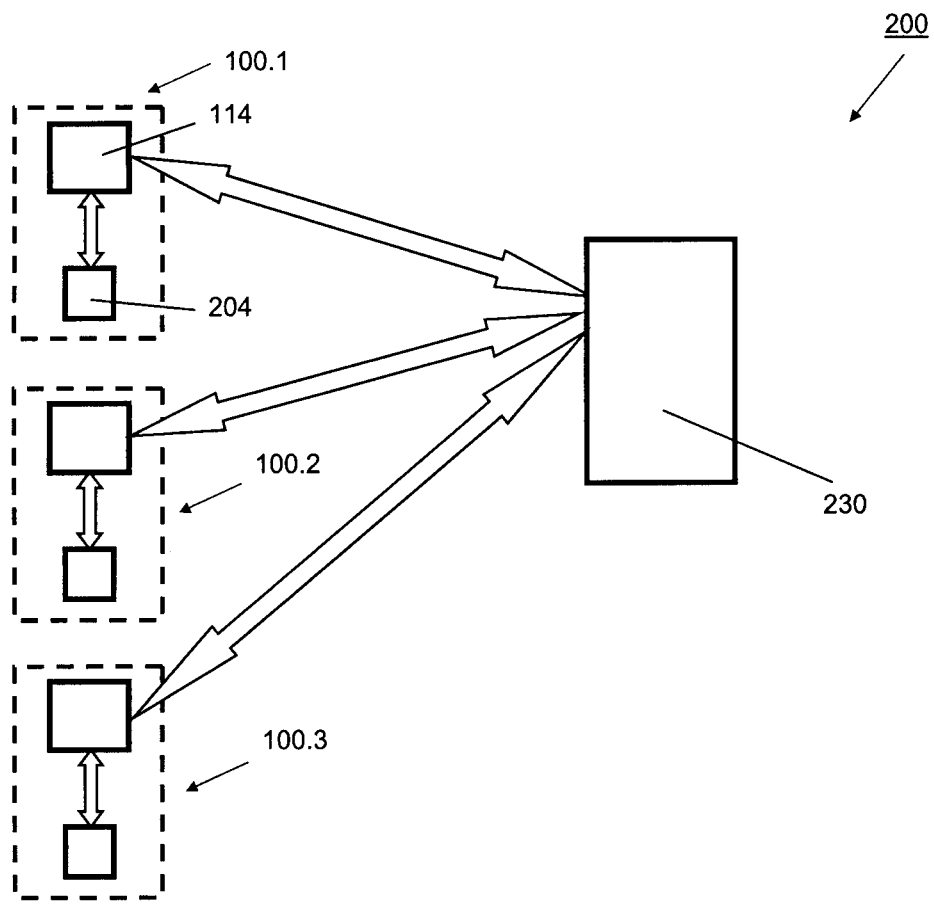

The computer 230 such as, for example, a laptop computer or smartphone, in wireless communication with the controller 114 of each of a plurality of wire rope devices 100.1, 100.2, . . . enables the operator to control the length adjustment of a plurality of wire rope devices 100.1, 100.2, . . . , employed for lifting a load, as illustrated in FIG. 3e. For example, the operator manually adjusts each of the wire rope devices based on the load data received from the wire rope devices such that the wire rope devices are exposed to a same load. Alternatively, the computer is programmed to determine the necessary adjustments and automatically controls the adjustment of each of the wire rope devices 100. The controller 114 of each of the wire rope devices can have a unique ID which is transmitted to the computer 230 for identification and enabling the operator to identify the location where each of the wire rope devices 100 is connected to the load.

Figure 4A:
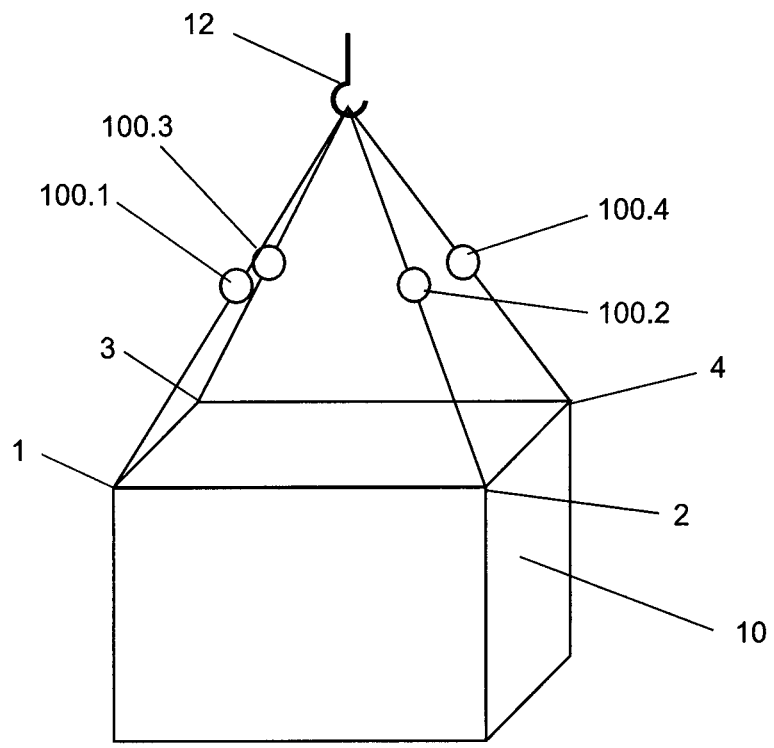
FIGS. 4a and 4b are simplified block diagrams illustrating determination of center of gravity of a load using the length adjustable wire rope device according to an embodiment of the invention.
Figure 4B:
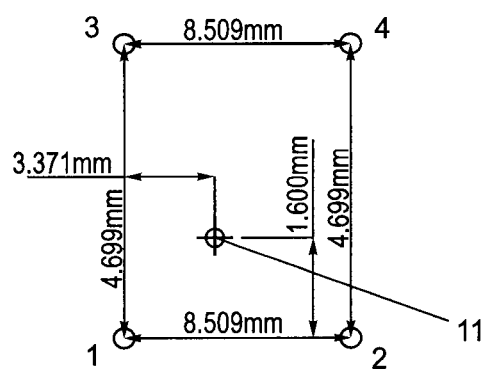

FIGS. 4a and 4b, illustrate the determination of the center of gravity of a load 10 using 4 wire rope devices 100.1, 100.2, 100.3, 100.4 connected at respective points 1, 2, 3, 4 to the load 10 and to a lifting device such as the hook 12 of a crane. When the load is fully suspended and stationary, the load acting on each of the wire rope devices is measured—in one case, a plurality of times and averaged. For example, the average load for each point (wire rope device 100) is:

Point 1: 5,537 kg;
Point 2: 3,053 kg;
Point 3: 2,330 kg; and,
Point 4: 2,107 kg.

Adding the loads acting at the 4 points provides the average total weight of the load 10 of 13,027 kg. Knowing the distances between the 4 points enables the determination of the center of gravity 11 of the load 10, as illustrated in FIG. 4b.

Optionally, the computer 230 transmits data indicative of the average total weight of the load 10 and the center of gravity 11 of the load 10 to a database of the client and/or the crane operator using cell phone communication.

If during lifting the controller 114 of the wire rope device 100 determines a load exceeding the capacity of the same, the controller 114 can shut down the operation thereof to prevent overload.

Load testing of wire rope devices is required every year for safety. The unique identification of each of the wire rope devices 100 as described hereinabove enables logging of the load testing in the memory 222 of each wire rope device 100 or, alternatively, in a central database for tracking the load testing of a plurality of wire rope devices 100. For example, when the wire rope device 100 is in use the operator is provided with a warning message if the one year period from the last load test has elapsed or the expiration date thereof is within a predetermined time interval such as, for example, 1 month.

Optionally, the controller 114 monitors the battery 112 and provides a warning message when battery capacity is low.

Further optionally, the controller 114 determines the length of extension of the wire ropes 102.1 and 102.2 and shuts down the operation of the wire rope device 100 to prevent the same from being extended/retracted too far.

Further optionally, the wire rope device 100 comprises temperature sensors connected to the controller 114 for sensing the temperature of the planetary gear 108 and the electric motor 110. In case a predetermined temperature limit is reached, the controller shuts down the operation of the wire rope device 100 to prevent overheating and sends a warning message to the operator indicating the same.

Further optionally, the controller 114 tracks the duty cycle, i.e. the hours of operation, of the wire rope device 100 and provides a warning message if the predetermined time limit of the duty cycle such as, for example, 20,000 hrs has elapsed or the expiration thereof is within a predetermined time interval such as, for example, 100 hrs.

Figure 5A:
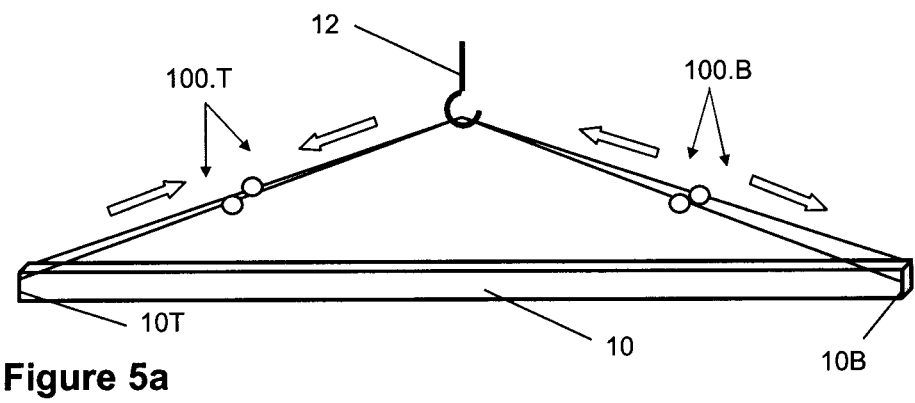
FIGS. 5a and 5b are simplified block diagrams illustrating rotation of a load using the length adjustable wire rope device according to an embodiment of the invention.
Figure 5B:
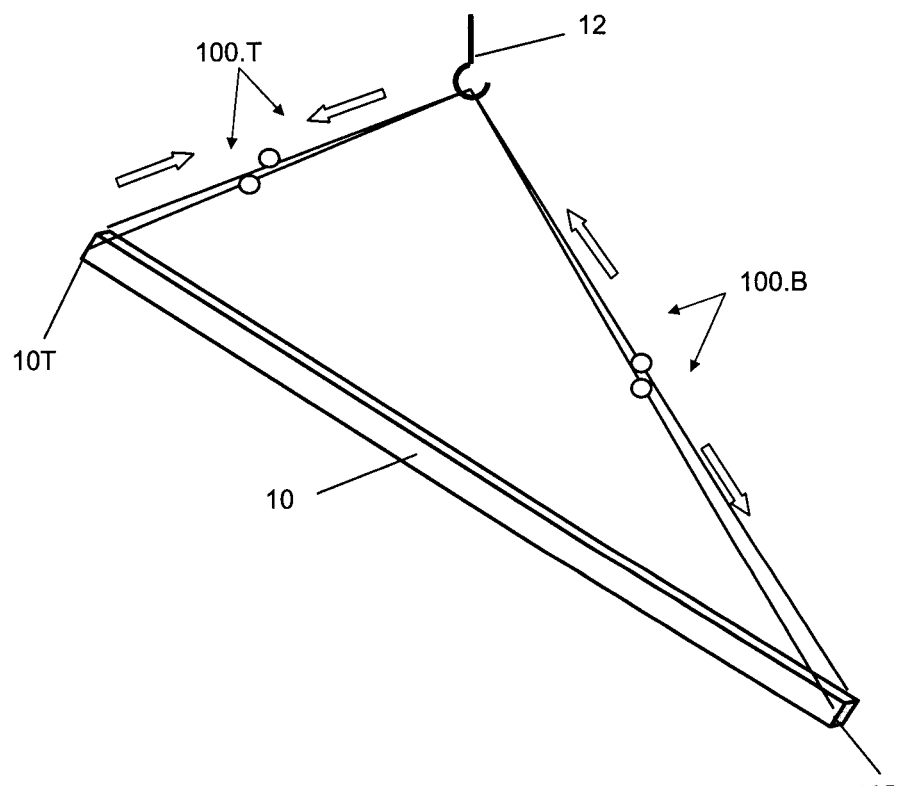

Referring to FIGS. 5a and 5b, an application of the wire rope devices 100 for rotating a load 10 from horizontal to vertical is illustrated. An elongated loads such as, for example, a wind turbine tower, is transported oriented horizontal and rotated into a vertical orientation for placing the same on its foundation. Typically, such loads are rotated using two cranes, a first (lifting) crane for raising the top end of the tower and a second (tailing) crane for lowering the bottom end of the tower. Using wire rope devices 100, a single crane is sufficient to perform this operation. Wire rope devices 100.T are connected to the top end 10T of the load 10 and hook 12, while wire rope devices 100.B are connected to the bottom end 10B of the load 10 and the same hook 12. By shortening the wire rope devices 100.T and lengthening the wire rope devices 100.B, as indicated by the block arrows in FIGS. 5a and 5b, the load 10 is rotated such that the top end 10T of the load 10 is raised and the bottom end 10B of the load 10 is lowered. This process is continued until the load 10 is oriented vertical.

Figure 6A:
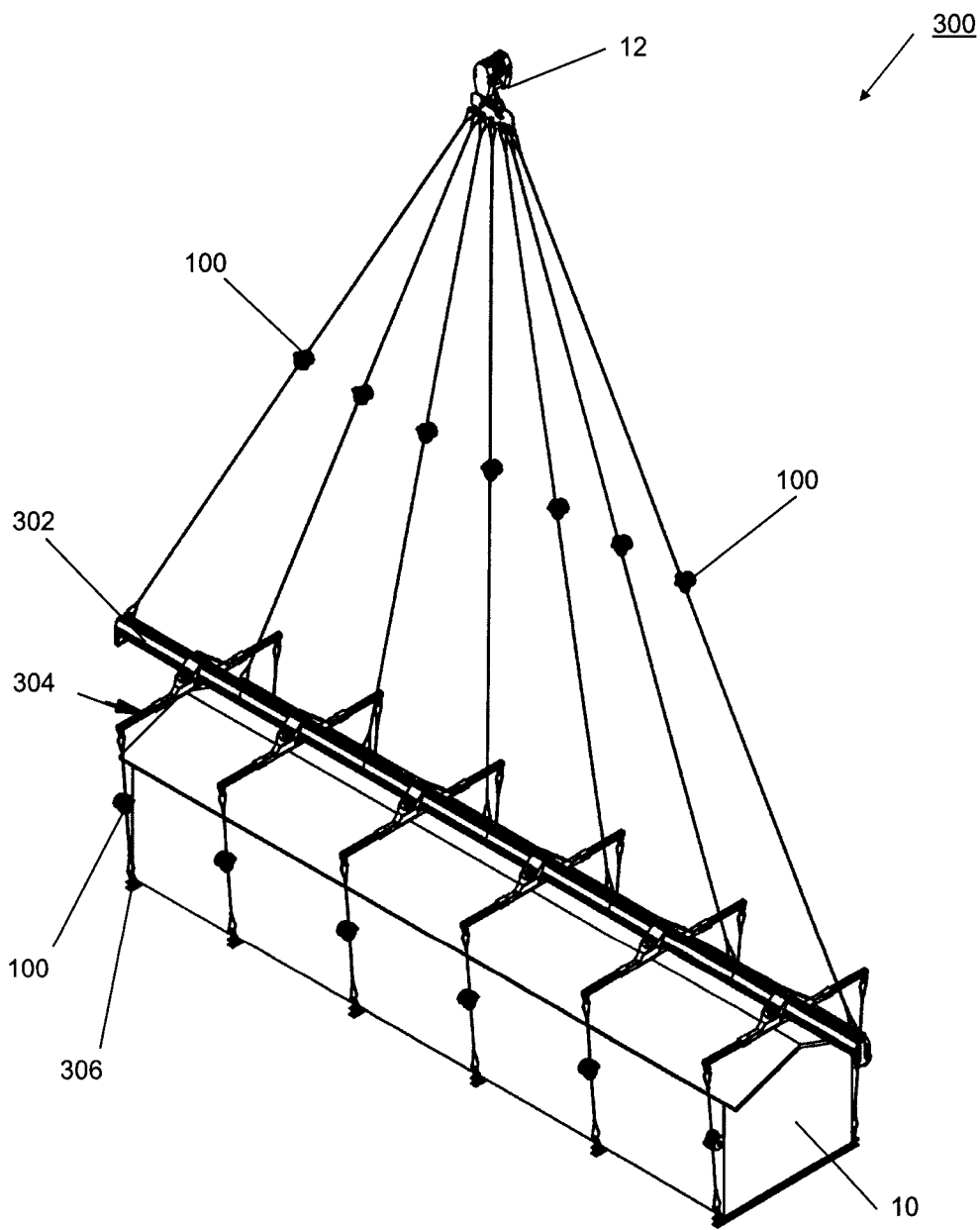
FIGS. 6a to 6d are simplified block diagrams illustrating in a perspective view, a top view, a front view, and a side view, respectively, a module lifting device according to an embodiment of the invention employing the length adjustable wire rope device.
Figure 6B:
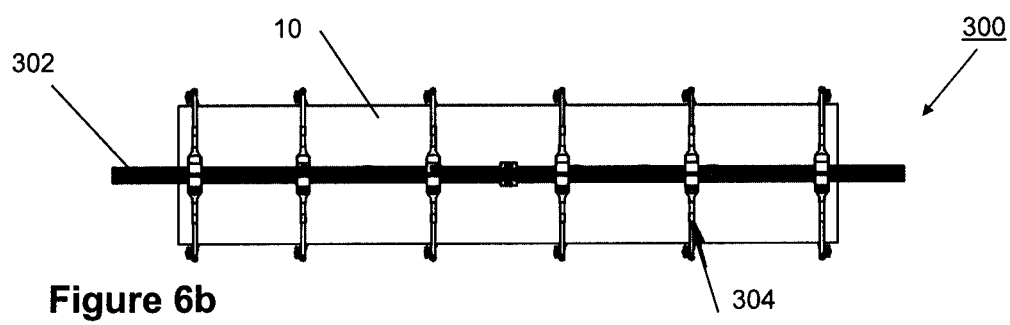
Figure 6C:
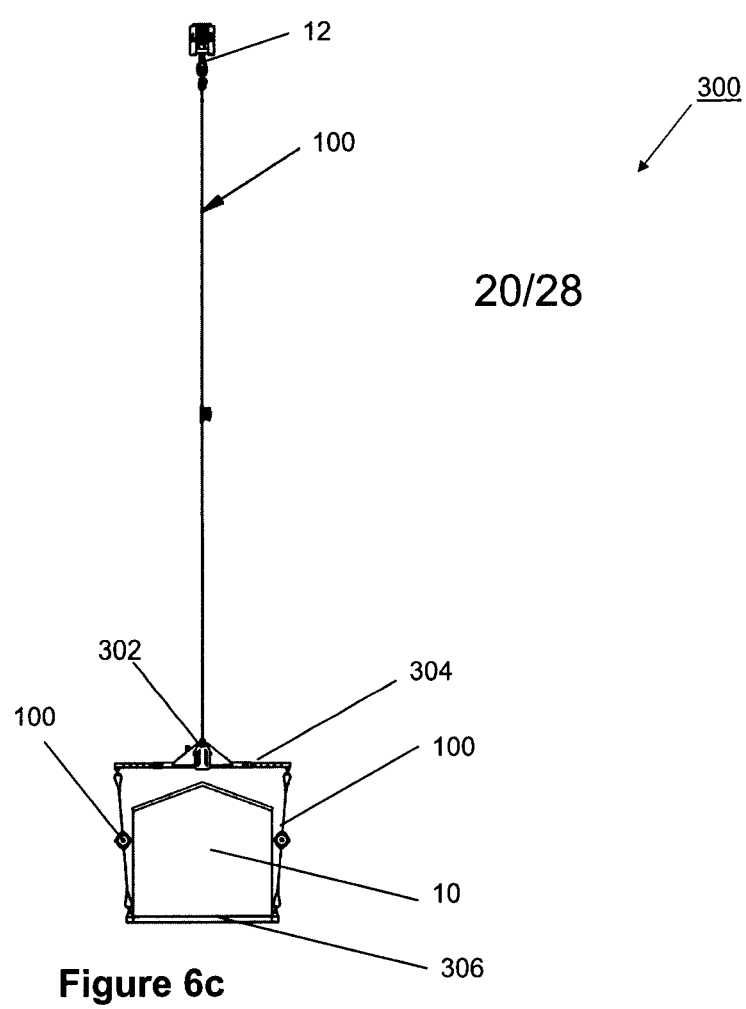
Figure 6D:
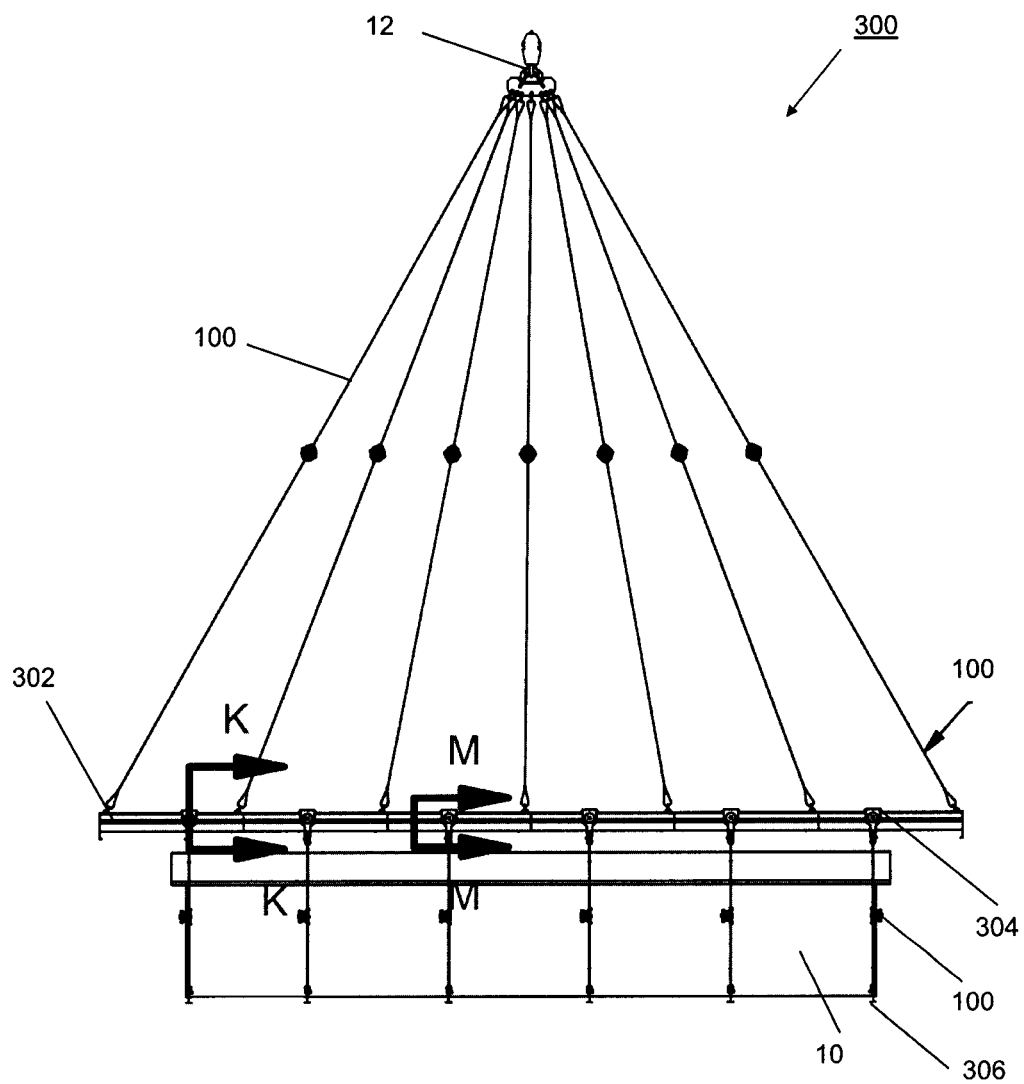
Figure 6E:
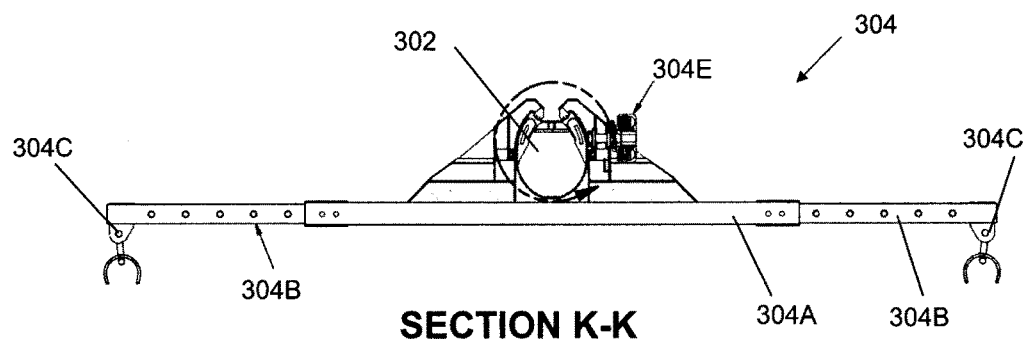
FIG. 6e is a simplified block diagram illustrating in a side view a load holding bar of the module lifting device according to an embodiment of the invention employing the length adjustable wire rope device.
Figure 6F:
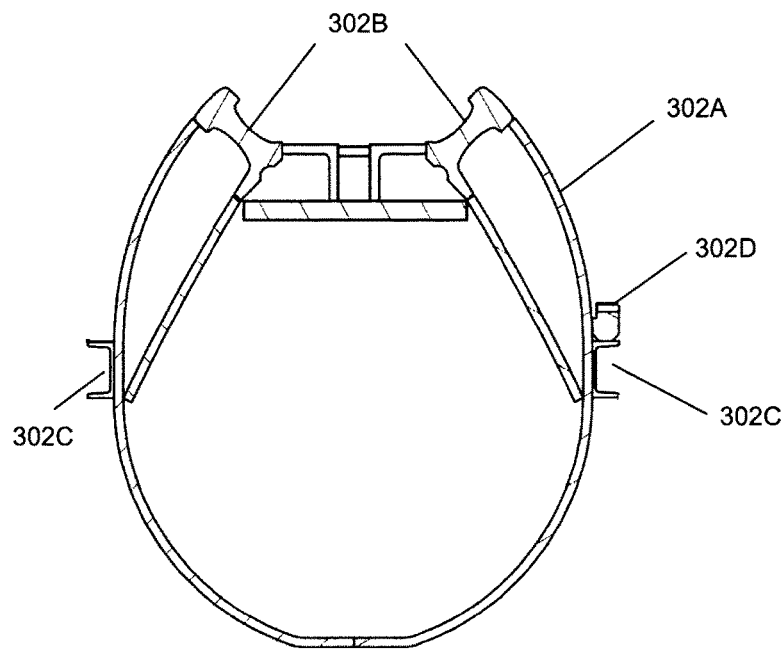
FIG. 6f is a simplified block diagram illustrating in a cross sectional view a spreader bar of the module lifting device according to an embodiment of the invention employing the length adjustable wire rope device.
Figure 6G:
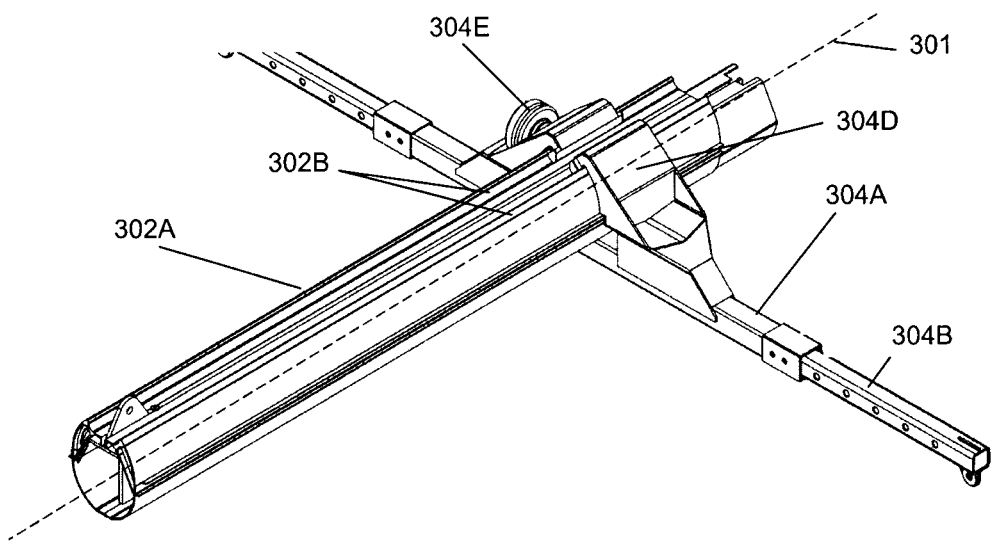
FIG. 6g is a simplified block diagram illustrating in a perspective view a section of the spreader bar having the load holding bar mounted thereto of the module lifting device according to an embodiment of the invention employing the length adjustable wire rope device.
Figure 6H:
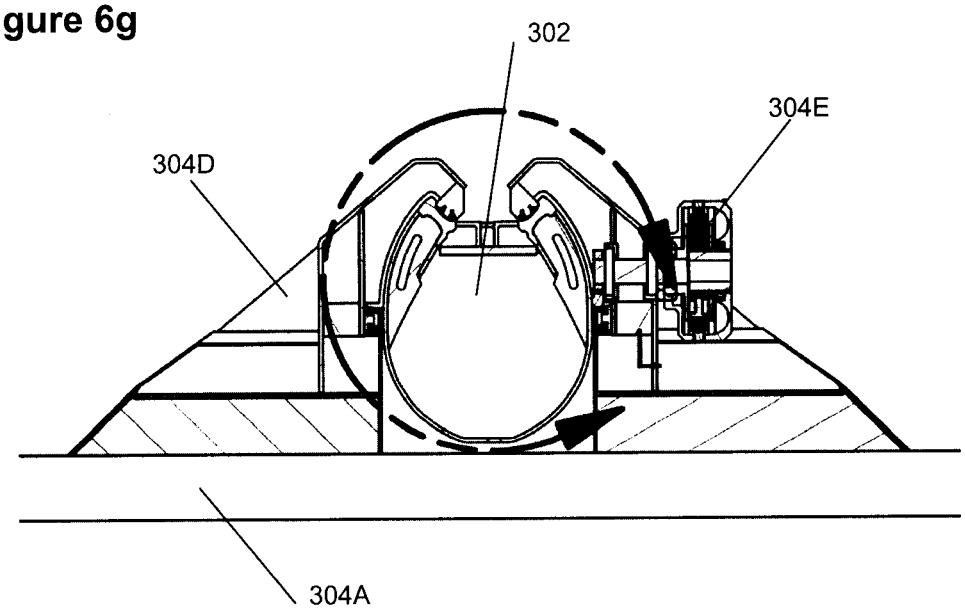
FIGS. 6h and 6i are simplified block diagram illustrating in cross sectional the load holding bar mounted to the spreader bar of the module lifting device according to an embodiment of the invention employing the length adjustable wire rope device.
Figure 6I:
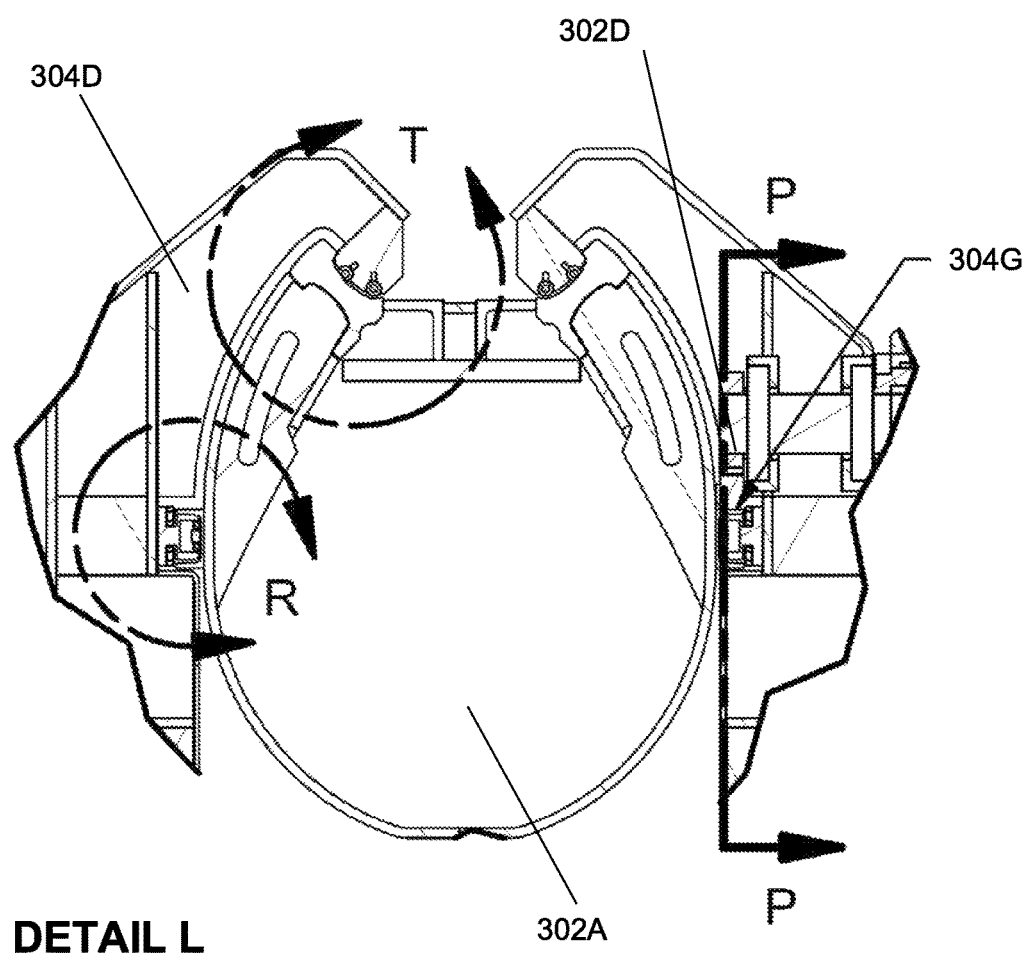
Figure 6J:
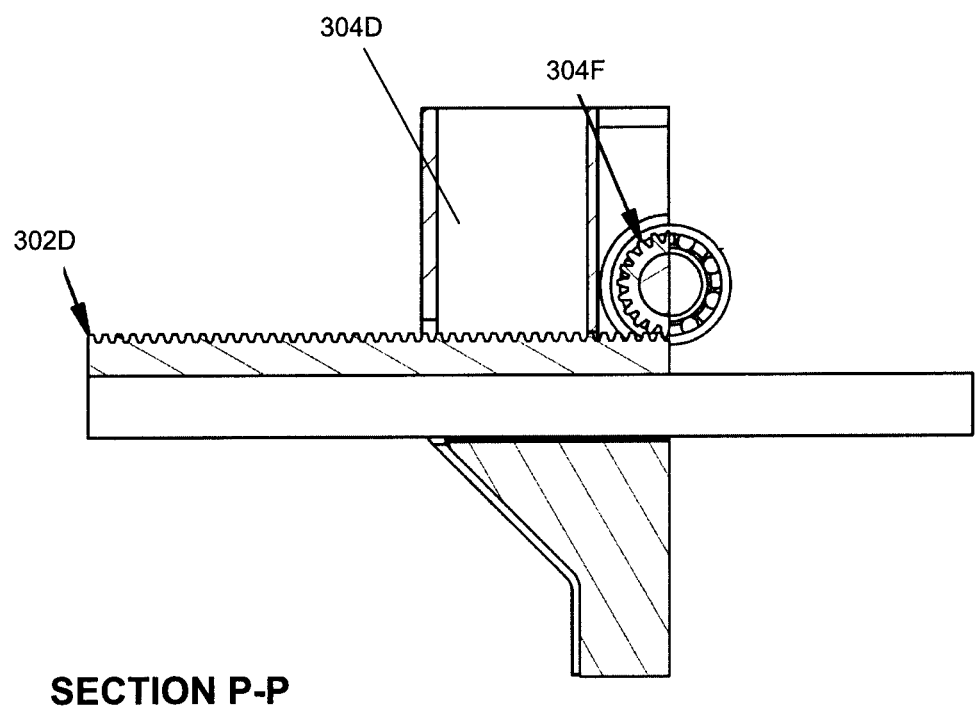
FIG. 6j is a simplified block diagram illustrating in a cross sectional view a detail of the drive mechanism of the load holding bar of the module lifting device according to an embodiment of the invention employing the length adjustable wire rope device.
Figure 6K:
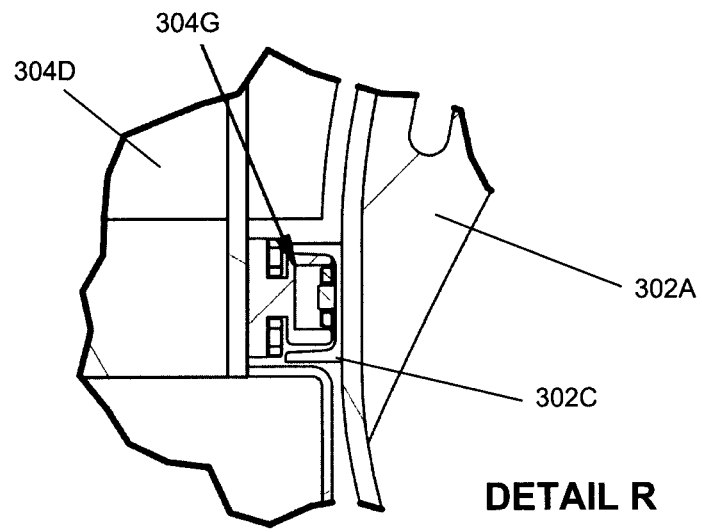
FIGS. 6k and 6l are simplified block diagrams illustrating in cross sectional views details of the load holding bar mounted to the spreader bar of the module lifting device according to an embodiment of the invention employing the length adjustable wire rope device; and, FIGS. 6m and 6n are simplified block diagrams illustrating in perspective views a coupling mechanism for connecting sections of the spreader bar of the module lifting device according to an embodiment of the invention employing the length adjustable wire rope device.
Figure 6L:
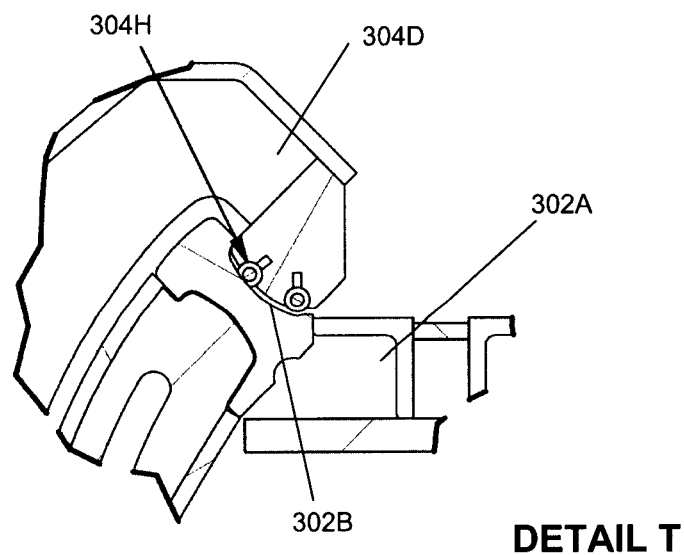
Figure 6M:
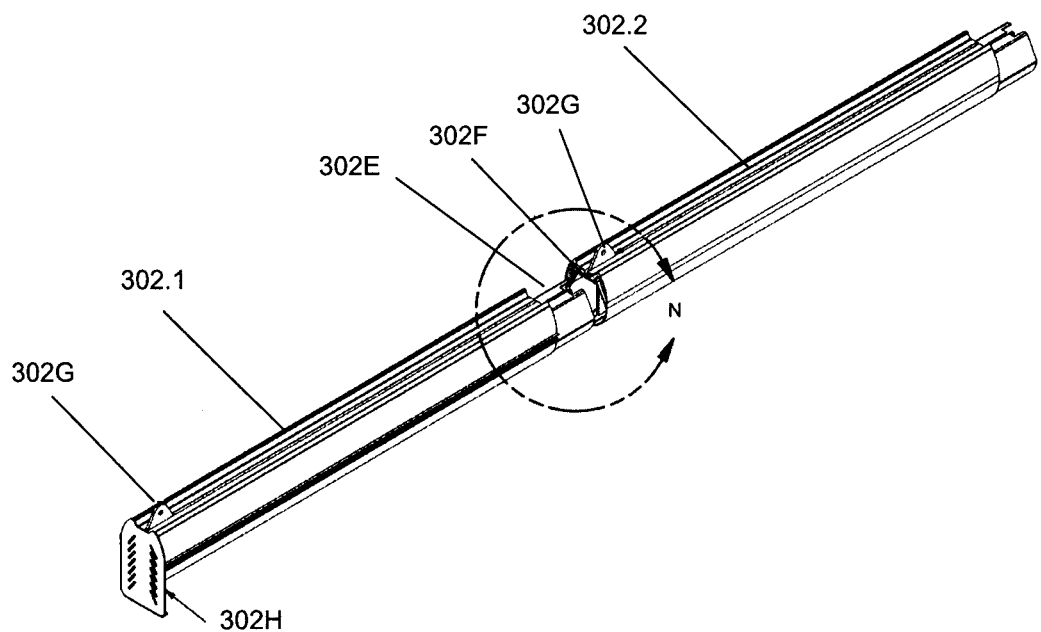
Figure 6N:
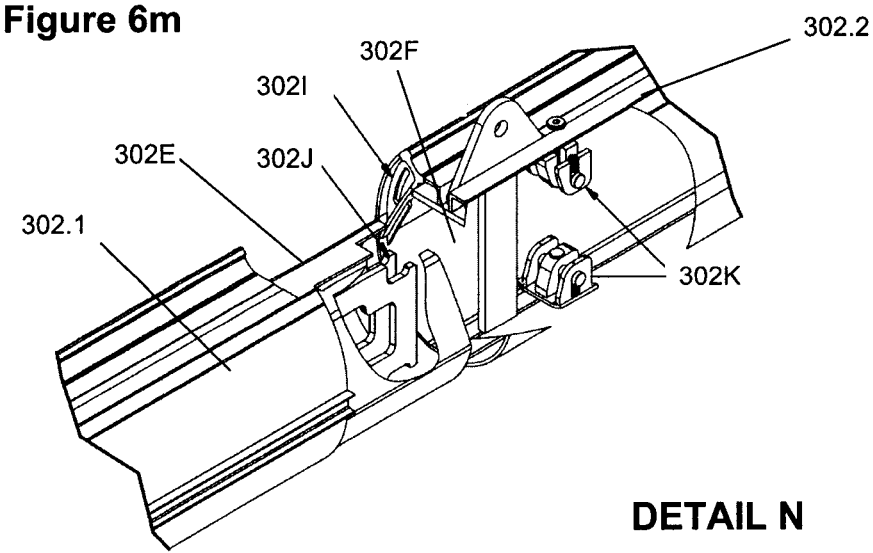

Referring to FIGS. 6a to 6n, a module lifting device 300 according to an embodiment of the invention is provided. The module lifting device 300 comprises a spreader bar 302 which is, in one case, connected via lift lugs 302G to a lifting device 12 using a plurality of wire rope devices 100. The spreader bar 302 has a rail system 302B, 302C disposed thereon along a longitudinal axis 301 thereof. A plurality of load holding bars 304 are movable mounted to the rail system 302B, 302C and oriented substantially perpendicular to spreader bar 302. A controllable load holding bar drive mechanism 304E is mounted to each load holding bar 304 for controllably moving the load holding bar 304 along the spreader bar 302. A wire rope device 100 is connected to a respective connecting element 304C disposed at each end of each load holding bar 304. A bottom end of each wire rope device 100 is connected to lift lugs of the module 10 or a module supporting bar 306 having the module 10 placed thereon.

Each load holding bar 304 can comprise sliding rails 304B to accommodate different widths of the modules, as illustrated in FIG. 3e.

The load holding bars 304 are movable mounted to the spreader bar 302 via support structure 304D comprising linear roller bearings 304H interacting with rails 302B and roller alignment bearings 304G interacting with rails 302C, as illustrated in FIGS. 6k and 6l. The load holding bars 304 are moved using a drive sprocket wheel 304F interacting with a linear drive gear 302D disposed on the spreader bar 302 along the longitudinal axis 301, as illustrated in FIGS. 6f and 6j. The same remotely controlled drive mechanism as in the wire rope device 100 can be employed in the drive 304E.

The spreader bar 302 can be of tubular 304A design having rib supports 302I mounted thereto along the longitudinal axis 301, for example, every 50 cm.

Optionally, the ends of the spreader bar 302 comprise support legs 302H mounted thereto to keep the spreader bar 302 erect for rigging and above ground.

The spreader bar 302 can be length adjustable by connecting respective mating end portions 302E, 302F of a plurality of spreader bar sections 302.1, 302.2, . . . , as illustrated in FIG. 6m, with each spreader bar section having a lift lug 302G.

The spreader bar sections can be connected using an automated locking device comprising guide locks 302J and spring loaded pins 302K, as illustrated in FIG. 6n. The spreader bar sections are connected by sliding end portion 302E into end portion 302F. Once the guide locks 302J come in contact with the pins 302K the pins 302K rise and allow the guide locks 302J to pass through. Once in place the springs force the pins 302K back to their original location and lock the guide locks 302J.

Remotely controlled lengthening/shortening of the wire rope devices 100 of the module lifting device 300, as well as movement of the load holding bars 304 along the spreader bar 302, enables balancing of the module 10.

The present invention has been described herein with regard to certain embodiments. However, it will be obvious to persons skilled in the art that a number of variations and modifications can be made without departing from the scope of the invention as described herein.

What is claimed is:

1. A wire rope device having adjustable length between a first end and a second end thereof, the wire rope device comprising:
   a first wire rope extending from the first end and a second wire rope extending from the second end;
   a length adjusting structure disposed between the first end and the second end, the length adjusting structure having the first wire rope and the second wire rope connected thereto;
   a support structure disposed between the first end and the second end, the support structure having the length adjusting structure rotatable movable mounted thereto;
   a first guiding structure and a second guiding structure disposed in the support structure for guiding the first wire rope and the second wire rope, respectively, such that when in operation a portion of the first wire rope extending from the first guiding element and a portion of the second wire rope extending from the second guiding element are disposed substantially along a same straight line; and,
   a drive mechanism mounted to the support structure and connected to the length adjusting structure for adjusting the length of the wire rope device by rotatably moving the length adjusting structure.

2. The wire rope device according to claim 1 wherein the length adjusting structure comprises a plurality of clamping devices connecting the length adjusting structure to the first and the second wire rope.

3. The wire rope device according to claim 2 wherein the support structure comprises a third guiding structure and a fourth guiding structure disposed in proximity to the second guiding structure and the first guiding structure, respectively, the third guiding structure and the fourth guiding structure for guiding the first wire rope and the second wire rope, respectively, such that when in operation a portion of the first wire rope and a portion of the second wire rope exit/enter the support structure substantially parallel to the straight line.

4. The wire rope device according to claim 3 wherein the clamping devices are operable in an open mode for receiving/releasing the respective wire rope and in a closed mode for clamping the respective wire rope.

5. The wire rope device according to claim 4 wherein the clamping devices are rotatable about an axis oriented substantially perpendicular to the straight line and wherein the clamping devices are in the open mode in proximity to the guiding structures for receiving/releasing the respective wire rope.

6. The wire rope device according to claim 5 wherein each of the clamping devices comprises a cup accommodating a plurality of collets therein with the cup being divided in to two portions for enabling opening of the cup for receiving/releasing the wire rope.

7. The wire rope device according to claim 6 wherein the support structure comprises a guiding channel accommodating the cups therein, the guiding channel having a cross section such that the cups are closed for clamping the respective wire rope and two cavities for enabling opening of the cups for receiving/releasing the respective wire rope.

8. The wire rope device according to claim 1 wherein the drive mechanism comprises a planetary gear and an electric motor.

9. The wire rope device according to claim 8 comprising control circuitry for controlling operation of the electric motor.

10. The wire rope device according to claim 9 wherein the control circuitry is adapted to enable wireless communication therewith.

11. The wire rope device according to claim 9 comprising at least a strain gauge connected to the control circuitry.

12. A system for lifting a load comprising:
   a plurality of wire rope devices, each wire rope device having a controllable drive mechanism for adjusting a length between a first eye and a second eye thereof; and,
   a controller in communication with the controllable drive mechanism of each of the wire rope devices, the controller for controllably adjusting the length of each of the wire rope devices.

13. The system according to claim 12 wherein the controller is adapted to communicate with the controllable drive mechanisms in a wireless fashion.

14. The system according to claim 12 wherein each of the wire rope devices comprises at least a strain gauge in communication with the controller.

15. The system according to claim 14 wherein the controller is adapted to determine data indicative of a load each wire rope device is exposed to and to generate control data for adjusting the length of each of the wire rope devices in dependence thereupon.

16. A module lifting device comprising:
- a spreader bar having a rail system disposed thereon along a longitudinal axis thereof;
- a plurality of load holding bars, each load holding bar being movable mounted to the rail system and oriented substantially perpendicular to spreader bar;
- a controllable load holding bar drive mechanism mounted to each load holding bar for controllably moving the load holding bar along the spreader bar; and,
- a wire rope device having a controllable drive mechanism for adjusting a length thereof connected to each end of each load holding bar.

17. The module lifting device according to claim 16 comprising a plurality of wire rope devices connected to the spreader bar at different locations along the longitudinal axis, each wire rope device having a controllable drive mechanism for adjusting a length thereof.

* * * * *